United States Patent
Young et al.

(10) Patent No.: US 11,061,374 B2
(45) Date of Patent: Jul. 13, 2021

(54) MULTI-FACTOR EVENT SEQUENCING AND ANALYTICS SYSTEMS

(71) Applicant: Ademco Inc., Golden Valley, MN (US)

(72) Inventors: Warren Young, Arden Hills, MN (US); Soumitri Kolavennu, Blaine, MN (US); Christopher Heintzelman, Plymouth, MN (US); Joseph Bodkin, South Burlington, VT (US); John Cronin, Jericho, VT (US)

(73) Assignee: Ademco Inc., Golden Valley, MN (US)

( * ) Notice: Subject to any disclaimer, the term of this patent is extended or adjusted under 35 U.S.C. 154(b) by 32 days.

(21) Appl. No.: 16/294,884

(22) Filed: Mar. 6, 2019

(65) Prior Publication Data

US 2020/0285206 A1 Sep. 10, 2020

(51) Int. Cl.
G05B 15/02 (2006.01)
H04L 29/08 (2006.01)

(52) U.S. Cl.
CPC ............ *G05B 15/02* (2013.01); *H04L 67/125* (2013.01)

(58) Field of Classification Search
CPC ................................ G05B 15/02; H04L 67/125
See application file for complete search history.

(56) References Cited

U.S. PATENT DOCUMENTS

| | | | | |
|---|---|---|---|---|
| 6,912,429 B1 * | 6/2005 | Bilger | ................... | H05B 47/105 |
| | | | | 700/19 |
| 8,078,556 B2 * | 12/2011 | Adi | ........................ | G06N 5/025 |
| | | | | 706/16 |
| 8,589,174 B2 * | 11/2013 | Nelson | .................... | G06Q 50/22 |
| | | | | 705/2 |
| 8,786,425 B1 * | 7/2014 | Hutz | ........................ | G08B 1/08 |
| | | | | 340/526 |
| 8,880,378 B2 * | 11/2014 | Cook | ..................... | G05B 15/02 |
| | | | | 702/181 |
| 9,207,659 B1 * | 12/2015 | Sami | ...................... | G05B 15/02 |
| 9,590,863 B1 * | 3/2017 | Martin | ................... | G05B 15/02 |
| 9,704,361 B1 | 7/2017 | Hazlewood et al. | | |
| 10,091,303 B1 * | 10/2018 | Ledvina | ................ | G01S 19/48 |

(Continued)

OTHER PUBLICATIONS

Claire Maternaghan and Kenneth J. Turner, Policy conflicts in home automation, Computer Networks, vol. 57, Issue 12, Aug. 2013, pp. 2429-2441 (Year: 2013).*

(Continued)

*Primary Examiner* — Christopher E. Everett
(74) *Attorney, Agent, or Firm* — Shumaker & Sieffert, P.A.

(57) ABSTRACT

A building management system comprising a plurality of sensors, each sensor of the plurality of sensors configured to detect a condition of the building is disclosed. The system may further comprise a memory for storing one or more events, each event configured to identify an action from a sequence of sensed conditions, a communications module configured to communicate with a remote device over a network, and a controller operatively coupled to the first sensor, the second sensor, the memory, and the communications module. The controller may be configured to compare the plurality of sensed conditions to the one or more events to identify an action and determine what, if any response is required, and if a response is required, provide a notification to the remove device via the communications module.

20 Claims, 14 Drawing Sheets

| Connected Home System ID | Date | Time | Time Range | Sequence ID | Sensor 1 | Sensor 2 | Sensor 3 | Sensor 4 | Sensor N |
|---|---|---|---|---|---|---|---|---|---|
| U0908 422a | 7/28 2018 | 6:00 am | 20 Min | U0908-123456020 | Coffee Pot - Activated | Alarm Clock - Activated | Alarm Clock - Deactivated | Upstairs Hallway Motion Detector - Activated | Kitchen Lights - Activated |
| U0908 422b | 7/28 2018 | 6:05 am | 25 Min | U0908-123456021 | Alarm Clock - Activated | Alarm Clock - Deactivated | Upstairs Hallway Motion Detector - Activated | Kitchen Lights - Activated | Kitchen Motion Detector - Activated |
| U0908 422c | 7/28 2018 | 6:10 am | 25 Min | U0908-123456022 | Alarm Clock - Deactivated | Upstairs Hallway Motion Detector - Activated | Kitchen Lights - Activated | Kitchen Motion Detector - Activated | Coffee Pot - Deactivated |
| - | - | - | - | - | - | - | - | - | - |
| EQ112 424a | 7/28 2018 | 9:00 am | 15 Min | EQ112-987654000 | Alarm Clock - Activated | Alarm Clock - Deactivated | Bathroom Lights - Activated | Shower - Activated | Shower - Deactivated |
| EQ112 424b | 7/28 2018 | 9:01 am | 20 Min | EQ112-987654001 | Alarm Clock - Deactivated | Bathroom Lights - Activated | Shower - Activated | Shower - Deactivated | Bathroom Lights - Deactivated |
| EQ112 424c | 7/28 2018 | 9:02 am | 15 Min | EQ112-987654002 | Bathroom Lights - Activated | Shower - Activated | Shower - Deactivated | Bathroom Lights - Deactivated | Kitchen Lights - Activated |
| - | - | - | - | - | - | - | - | - | - |
| RT454 426a | 7/28 2018 | 5:00 pm | 5 Min | RT454-654321000 | Garage Door - Opened | Front Yard Motion Detector - Activated | Doorbell Cam Owner 1 Recognized | Smart Lock - Code Accepted | Wi-Fi - Owner 1 Connected |
| RT454 426b | 7/28 2018 | 5:02 pm | 10 Min | RT454-654321001 | Front Yard Motion Detect - Activated | Doorbell Cam Owner 1 Recognized | Smart Lock - Code Accepted | Wi-Fi - Owner 1 Connected | Television - Activated |
| RT454 426c | 7/28 2018 | 5:05 pm | 10 Min | RT454-654321002 | Doorbell Cam Owner 1 Recognized | Smart Lock - Code Accepted | Wi-Fi - Owner 1 Connected | Television - Activated | Kitchen Lights - Activated |
| - | - | - | - | - | - | - | - | - | - |

(56) References Cited

U.S. PATENT DOCUMENTS

| | | | | |
|---|---|---|---|---|
| 2003/0229471 | A1* | 12/2003 | Guralnik | G08B 21/0423 |
| | | | | 702/182 |
| 2004/0243257 | A1* | 12/2004 | Theimer | H04M 1/72569 |
| | | | | 700/44 |
| 2007/0233285 | A1* | 10/2007 | Yamamoto | H04L 12/2825 |
| | | | | 700/28 |
| 2010/0289643 | A1* | 11/2010 | Trundle | H04L 12/282 |
| | | | | 340/545.1 |
| 2010/0289644 | A1* | 11/2010 | Slavin | G08B 21/18 |
| | | | | 340/568.1 |
| 2014/0006660 | A1* | 1/2014 | Frei | H04L 67/141 |
| | | | | 710/104 |
| 2014/0031989 | A1* | 1/2014 | Bergman | F24F 11/62 |
| | | | | 700/276 |
| 2015/0046534 | A1* | 2/2015 | Frei | H04W 4/14 |
| | | | | 709/204 |
| 2015/0066158 | A1* | 3/2015 | Kim | H04L 12/283 |
| | | | | 700/3 |
| 2015/0309483 | A1* | 10/2015 | Lyman | G05B 15/02 |
| | | | | 700/275 |
| 2015/0369503 | A1 | 12/2015 | Flaherty et al. | |
| 2016/0259308 | A1* | 9/2016 | Fadell | H04W 4/80 |
| 2016/0337144 | A1* | 11/2016 | Kim | H04L 67/02 |
| 2018/0159593 | A1* | 6/2018 | Bogdan | H04L 12/4625 |
| 2018/0299854 | A1 | 10/2018 | Law et al. | |
| 2019/0208020 | A1* | 7/2019 | Um | H04L 67/125 |

OTHER PUBLICATIONS

Extended European Search Report from counterpart European Application No. 20160813.0, dated Aug. 6, 2020, 8 pp.

Response to Rule 70(2) and 70a(2) of the EPC dated Sep. 14, 2020, from counterpart European Application No. 20160813.0, filed Mar. 9, 2021, 75 pp.

* cited by examiner

| Connected Home System ID | Date | Time | Time Range | Sequence ID | Sensor 1 | Sensor 2 | Sensor 3 | Sensor 4 | Sensor N |
|---|---|---|---|---|---|---|---|---|---|
| U0908 | 7/28 2018 | 6:00 am | 20 Min | U0908-123456020 | Coffee Pot - Activated | Alarm Clock - Activated | Alarm Clock - Deactivated | Upstairs Hallway Motion Detector - Activated | Kitchen Lights - Activated |
| - | - | - | - | - | - | - | - | - | - |
| - | - | - | - | - | - | - | - | - | - |
| - | - | - | - | - | - | - | - | - | - |

FIG. 8

| Connected Home System ID | Date | Time | Time Range | Sequence ID | Sensor 1 | Sensor 2 | Sensor 3 | Sensor 4 | Sensor N |
|---|---|---|---|---|---|---|---|---|---|
| UO908 722a | 7/28 2018 | 6:00 am | 20 Min | UO908-123456000 | Coffee Pot - Activated | Alarm Clock - Activated | Alarm Clock - Deactivated | Upstairs Hallway Motion Detector - Activated | Kitchen Lights - Activated |
| UO908 722b | 7/28 2018 | 6:05 am | 25 Min | UO908-123456001 | Alarm Clock - Activated | Alarm Clock - Deactivated | Upstairs Hallway Motion Detector - Activated | Kitchen Lights - Activated | Kitchen Motion Detector - Activated |
| UO908 722c | 7/28 2018 | 6:10 am | 25 Min | UO908-123456002 | Alarm Clock - Deactivated | Upstairs Hallway Motion Detector - Activated | Kitchen Lights - Activated | Kitchen Motion Detector - Activated | Coffee Pot - Deactivated |
| - | - | - | - | - | - | - | - | - | - |
| - | - | - | - | - | - | - | - | - | - |

FIG. 11

MULTI-FACTOR EVENT SEQUENCING AND ANALYTICS SYSTEMS

TECHNICAL FIELD

The disclosure generally relates to building systems, and more particularly to systems and methods for aggregating sensor data in or near a building.

BACKGROUND

Building Automation Systems (BAS) and/or various home control systems are used to control one of more functions of a building or home. A Building Automation System and/or a home control system can include, for example, an HVAC system, a lighting control system, a fire suppression systems, a security system, and/or any other suitable building automation system. A Building Automation System and/or home control systems typically include one or more sensors and/or other devices that are operatively coupled to a central controller or the like, often via wireless communication. These sensors and/or devices may be used to monitor parameters within the building or home, including, but not limited to, temperature, humidity, motion, etc.

What would be desirable are improved methods and systems for managing actions and notifications in a building management system.

SUMMARY

This disclosure generally relates to systems and method for enhanced building security and data collection.

In a first example, a method for detecting an event in or near a building, the building including one or more sensors each detecting a sensed condition, may comprise storing two or more events. Each event may define a sequence of two or more conditions, an action associated with the sequence of sensed conditions, and a recommended response to the sequence of two or more conditions. The method may further comprise monitoring one or more sensed conditions over time, repeatedly comparing the one or more sensed conditions to the two or more events to identify when a sequence of sensed conditions matches the sequence of two or more conditions in at least one of the two or more events, and performing the recommended response defined by the event that matched the sensed conditions.

Alternatively or additionally to any of the examples above, in another example, the event may be a user defined event.

Alternatively or additionally to any of the examples above, in another example, defining the user defined event may comprise initiating a set-up sequence module, performing the action to be associated with a sequence of sensed conditions, recoding the sequence of sensed conditions as the action is recorded, exiting the set-up sequence module, and saving sequence of sensed conditions as the user defined event.

Alternatively or additionally to any of the examples above, in another example, the method may further comprise assigning an action name to the user defined event.

Alternatively or additionally to any of the examples above, in another example, the method may further comprise assigning a recommended response to the user defined event.

Alternatively or additionally to any of the examples above, in another example, the event may be an event recommended by an external server.

Alternatively or additionally to any of the examples above, in another example, the action for at least one event may be a person arriving at the building.

Alternatively or additionally to any of the examples above, in another example, the action for at least one event may be a person leaving the building.

Alternatively or additionally to any of the examples above, in another example, the action for at least one event may be a person waking up.

Alternatively or additionally to any of the examples above, in another example, the recommended response may comprise delivering a notification to a remote device over a network.

Alternatively or additionally to any of the examples above, in another example, the notification may summarize the action and the sequence of sensed conditions.

In another example, a building automation system configured to be used in or near a building may comprise a plurality of sensors, each sensor of the plurality of sensors configured to detect a condition of the building, a memory for storing one or more events, each event configured to identify an action from a sequence of sensed conditions, a communications module configured to communicate with a remote device over a network, and a controller operatively coupled to the first sensor, the second sensor, the memory, and the communications module. The controller may be configured to compare the plurality of sensed conditions to the one or more events to identify an action and determine what, if any response is required, and if a response is required, provide a notification to the remove device via the communications module.

Alternatively or additionally to any of the examples above, in another example, a first sensor of the plurality of sensors may comprise a motion detector.

Alternatively or additionally to any of the examples above, in another example, a first sensor of the plurality of sensors may comprise a limit switch.

Alternatively or additionally to any of the examples above, in another example, a first sensor of the plurality of sensors may comprise an Internet of Things (IoT) device.

Alternatively or additionally to any of the examples above, in another example, a first sensor of the plurality of sensors may comprise a camera.

Alternatively or additionally to any of the examples above, in another example, a first sensor of the plurality of sensors may comprise a network connection.

Alternatively or additionally to any of the examples above, in another example, the plurality of sensors may be located at the building, the controller and the communications module may be located in the building, and the remote device may be a portable handheld device.

In another example, a server for monitoring a building may comprise a memory for storing one or more events, each event configured to identify an action from a sequence of conditions and including a recommended response, an input/output port for receiving the one or more sensed conditions from the building, and a controller operatively coupled memory and the input/output port. The controller may be configured to monitor the one or more sensed conditions over time, repeatedly applying the one or more events to the one or more sensed conditions to identify when a sequence of sensed conditions matches the sequence of conditions in at least one of the one or more events, and perform the recommended action defined by the event that resulted in the match.

Alternatively or additionally to any of the examples above, in another example, the action may trigger two or more sensors of the plurality of sensors.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following detailed description of various embodiments in connection with the accompanying drawings, in which:

FIG. 8 is an illustrative network recommendations database;

FIG. 11 is an illustrative building automation system raw sequence database;

Figure 1:
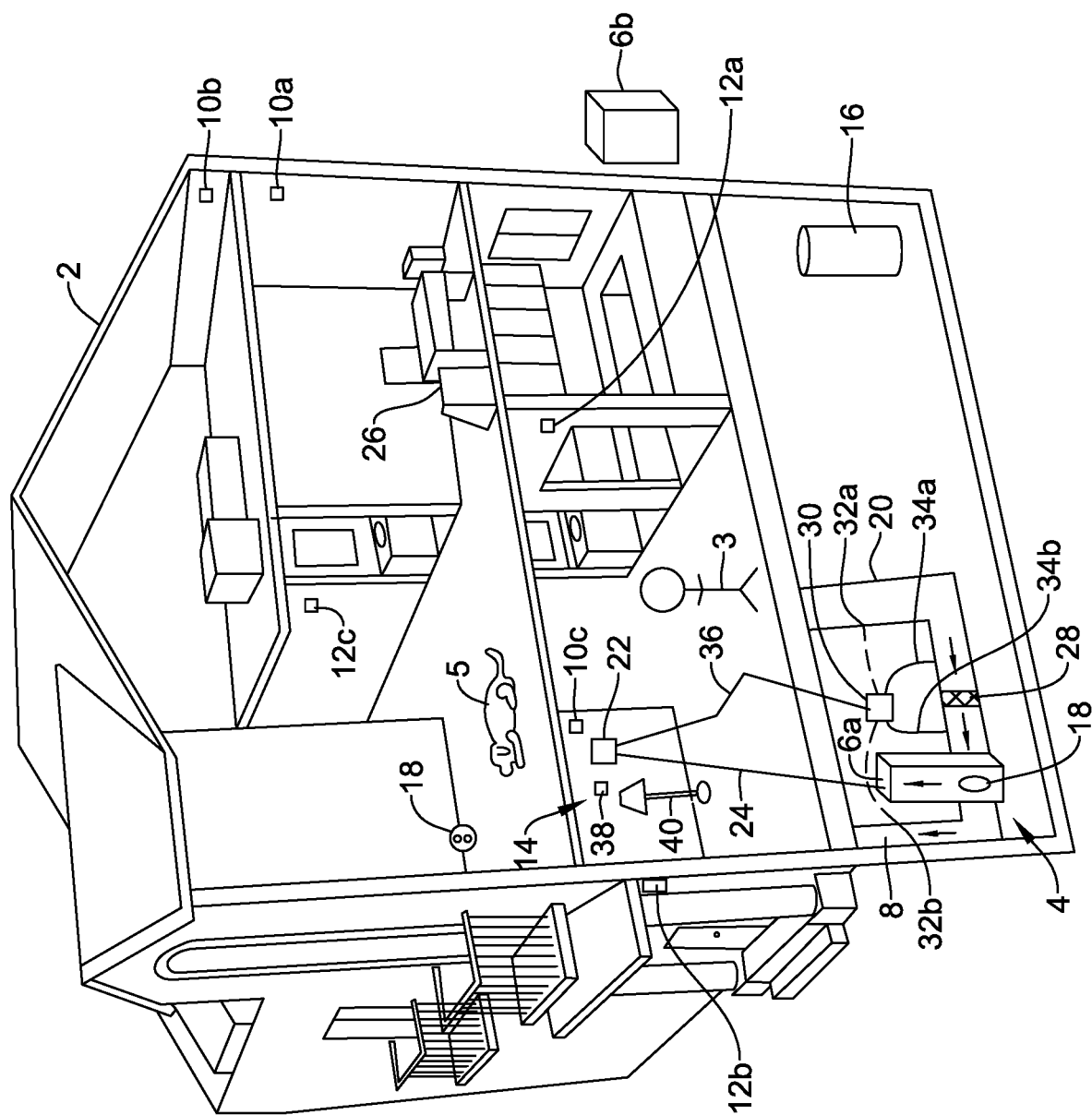
FIG. 1 is a schematic view of an illustrative building including various home automation systems.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION

The following detailed description should be read with reference to the drawings in which similar elements in different drawings are numbered the same. The detailed description and the drawings, which are not necessarily to scale, depict illustrative embodiments and are not intended to limit the scope of the disclosure. The illustrative embodiments depicted are intended only as exemplary. Selected features of any illustrative embodiment may be incorporated into an additional embodiment unless clearly stated to the contrary.

This disclosure generally relates to building and/or home automation systems, and more particularly to the aggregation of data to define a single action and reduce notifications to a user from a plurality of home devices. For clarity, the following description will be described with respect to a home automation system including a comfort system (e.g., an HVAC system), a security system, and/or any number of Internet of Things (IoT) devices (e.g., household devices having built-in wireless connectivity, sometimes called "smart" devices or "connected" devices), however the systems and methods described herein may be applied to commercial buildings, hotels, apartment buildings, etc. The home automation system may include one or more of an HVAC system, a lighting control system, a fire suppression system, a security system, and any other suitable home automation system devices.

FIG. 1 is a schematic view of a building 2 having an illustrative heating, ventilation, and air conditioning (HVAC) system 4 and an illustrative security system 14. The building 2 may be routinely occupied by a person or people 3 and, in some cases, one or more pets 5. While FIG. 1 shows a typical forced air type HVAC system, other types of HVAC systems are contemplated including, but not limited to, boiler systems, radiant heating systems, electric heating systems, cooling systems, heat pump systems, and/or any other suitable type of HVAC system, as desired. The illustrative HVAC system 4 of FIG. 1 includes one or more HVAC components 6a, 6b (collectively, 6), a system of ductwork and air vents including a supply air duct 8 and a return air duct 20, and one or more controllers 22. The one or more HVAC components 6 may include, but are not limited to, a furnace, a heat pump, an electric heat pump, a geothermal heat pump, an electric heating unit, an air conditioning unit, a humidifier, a dehumidifier, an air exchanger, an air cleaner, a damper, a valve, and/or the like.

The illustrative HVAC system 4 may further include one or more sensors or devices 10a, 10b (collectively, 10) configured to measure a parameter of the environment to be controlled. The sensors or device may be any type of sensor or device (including IoT devices) suitable for operation in or use within a building automation system. The one or more sensors or devices 10 may include, but are not limited to, temperatures sensors, humidity sensors, carbon dioxide sensors, occupancy sensors, proximity sensors, etc. Each of the sensor/devices 10 may be operatively connected to the controller 22 via a corresponding communications port (not explicitly shown). It is contemplated that the communications port may be wired and/or wireless. When the communications port is wireless, the communications port may include a wireless transceiver, and the controller 22 may include a compatible wireless transceiver. It is contemplated that the wireless transceivers may communicate using a standard and/or a proprietary communication protocol. Suitable standard wireless protocols may include, for example, cellular communication, ZigBee, Bluetooth, WiFi, IrDA, dedicated short range communication (DSRC), EnOcean, or any other suitable wireless protocols, as desired.

It is contemplated that the controller(s) 22 may be configured to control the comfort level in the building or structure by activating and deactivating the HVAC component(s) 6 in a controlled manner. The controller(s) 22 may be configured to control the HVAC component(s) 6 via a wired or wireless communication link 24. In some cases, the controller(s) 22 may be a thermostat, such as, for example, a wall mountable thermostat, but this is not required in all embodiments. Such a thermostat may include (e.g., within the thermostat housing) or have access to a temperature sensor for sensing an ambient temperature at or near the thermostat. In some instances, the controller(s) 22 may be a zone controller, or may include multiple zone controllers each monitoring and/or controlling the comfort level within a particular zone in the building or other structure. As will be described in more detail herein, the controller(s) 22 may be configured to control the security system and/or other home automation devices or to communicate with separate controllers dedicated to the security system and/or other home automation devices.

In the illustrative HVAC system 4 shown in FIG. 1, the HVAC component(s) 6 may provide heated air (and/or cooled air) via the ductwork throughout the building 2. While not explicitly shown, the HVAC component(s) 6 may be in fluid communication with every room and/or zone in the building 2 via the ductwork 8 and 20, but this is not required. In operation, when a heat call signal is provided by the controller(s) 22, an HVAC component 6a (e.g., forced warm air furnace) may be activated to supply heated air to one or more rooms and/or zones within the building 2 via supply air ducts 8. The heated air may be forced through supply air duct 8 by a blower or fan 17. In this example, the cooler air from each zone may be returned to the HVAC component 6 (e.g. forced warm air furnace) for heating via return air ducts 20. Similarly, when a cool call signal is provided by the controller(s) 22, an HVAC component 6b (e.g. air conditioning unit) may be activated to supply cooled air to one or more rooms and/or zones within the building or other structure via supply air ducts 8. The cooled air may be forced through supply air duct 8 by the blower or fan 17. In this example, the warmer air from each zone may be returned to the HVAC component 6b (e.g., air conditioning unit) for cooling via return air ducts 20. In some cases, the HVAC system 4 may include an internet gateway or other device 26 that may allow one or more of the HVAC components, as described herein, to communicate over a wide area network (WAN) such as, for example, the Internet.

In some cases, the system of vents or ductwork 8 and/or 20 can include one or more dampers (not explicitly shown) to regulate the flow of air, but this is not required. For example, one or more dampers may be coupled to one or more controller(s) 22, and can be coordinated with the operation of one or more HVAC components 6. The one or more controller(s) 22 may actuate dampers to an open position, a closed position, and/or a partially open position to modulate the flow of air from the one or more HVAC components 6 to an appropriate room and/or zone in the building or other structure. The dampers may be particularly useful in zoned HVAC systems, and may be used to control which zone(s) receives conditioned air from the HVAC component(s) 6.

In many instances, one or more air filters 28 may be used to remove dust and other pollutants from the air inside the building 2. In the illustrative example shown in FIG. 1, the air filter(s) 30 is installed in the return air duct 20, and may filter the air prior to the air entering the HVAC component 6, but it is contemplated that any other suitable location for the air filter(s) 30 may be used. The presence of the air filter(s) 28 may not only improve the indoor air quality, but may also protect the HVAC components 6 from dust and other particulate matter that would otherwise be permitted to enter the HVAC component.

In some cases, and as shown in FIG. 1, the illustrative HVAC system 4 may include an equipment interface module (EIM) 30. When provided, the equipment interface module 30 may, in addition to controlling the HVAC under the direction of the thermostat, be configured to measure or detect a change in a given parameter between the return air side and the discharge air side of the HVAC system 4. For example, the equipment interface module 30 may measure a difference in temperature, flow rate, pressure, or a combination of any one of these parameters between the return air side and the discharge air side of the HVAC system 4. In some cases, the equipment interface module 30 may be adapted to measure the difference or change in temperature (delta T) between a return air side and discharge air side of the HVAC system 4 for the heating and/or cooling mode. The delta T for the heating and cooling modes may be calculated by subtracting the return air temperature from the discharge air temperature (e.g. delta T=discharge air temperature− return air temperature)

In some cases, the equipment interface module 30 may include a first temperature sensor 32a located in the return (incoming) air duct 20, and a second temperature sensor 32b located in the discharge (outgoing or supply) air duct 8. Alternatively, or in addition, the equipment interface module 34 may include a differential pressure sensor including a first pressure tap 34a located in the return (incoming) air duct 20, and a second pressure tap 34b located downstream of the air filter 28 to measure a change in a parameter related to the amount of flow restriction through the air filter 28. In some cases, the equipment interface module 30, when provided, may include at least one flow sensor that is capable of providing a measure that is related to the amount of air flow restriction through the air filter 28. In some cases, the equipment interface module 34 may include an air filter monitor. These are just some examples.

When provided, the equipment interface module 30 may be configured to communicate with the controller 22 via, for example, a wired or wireless communication link 36. In other cases, the equipment interface module 30 may be incorporated or combined with the HVAC controller 22. In either case, the equipment interface module 30 may communicate, relay or otherwise transmit data regarding the selected parameter (e.g. temperature, pressure, flow rate, etc.) to the controller 22. In some cases, the controller 22 may use the data from the equipment interface module 30 to evaluate the system's operation and/or performance. For example, the controller 22 may compare data related to the difference in temperature (delta T) between the return air side and the discharge air side of the HVAC system 4 to a previously determined delta T limit stored in the controller 22 to determine a current operating performance of the HVAC system 4.

The illustrative security system 14 may include a central controller 38 and a number of sensors/devices 12a, 12b, 12c (collectively, 12). While the security system controller 38 is illustrated as a separate controller from the HVAC controller 22, it is contemplated that the security system controller 38 and the HVAC controller 22 may be provided as a single controller which communicates with and controls both the HVAC system 4 and the security system 14. The sensor/devices 12 may be configured to detect threats within and/or around the building 2. In some cases, some of the sensor/devices 12 may be constructed to detect different threats. For example, some of the sensor/devices 12 may be limit switches located on doors and windows of the building 2, which are activated by entry of an intruder into the building 2 through the doors and windows. Other suitable security sensor/devices 12 may include fire, smoke, water, carbon monoxide, and/or natural gas detectors, to name a few. Still other suitable security system sensor/devices 12 may include motion sensors that detect motion of intruders in the building 2 or noise sensors or microphones that detect the sound of breaking glass. It is contemplated that the motion sensor may be passive infrared (PIR) motion sensors, a microwave motion sensor, an ultrasonic motion sensor, a tomographic motion sensor, a video camera having motion detection software, a vibrational motion sensor, etc. In some cases, one or more of the sensor/devices 12 may include a video camera. In some cases, the sensor/devices 12 may include a horn or alarm, a damper actuator controller (e.g. that closes a damper during a fire event), a light controller for automatically turning on/off lights to simulate occupancy, and/or any other suitable device/sensor. These are just examples. More generally, the sensors 12 may be any type of sensor or device (including IoT devices) suitable for operation in or use within a building automation system.

During operation of the illustrative security system 14, the central controller 38 monitors the status of each of the sensor/devices 12. Upon detecting a change of status in one of the sensor/devices 12, the central controller may activate an alarm device, record and/or transmit live video from one of the sensor/devices 12, operate an actuator, contact an off-site central monitoring station (not shown), and/or perform any other suitable action.

Each of the sensor/devices 12 may be operatively connected to the central controller 38 via a corresponding communications port (not explicitly shown). It is contemplated that the communications port may be wired and/or wireless. When the communications port is wireless, the communications port may include a wireless transceiver, and the central controller 38 may include a compatible wireless transceiver. It is contemplated that the wireless transceivers may communicate using a standard and/or a proprietary communication protocol. Suitable standard wireless protocols may include, for example, cellular communication, ZigBee, Bluetooth, WiFi, IrDA, dedicated short range communication (DSRC), EnOcean, or any other suitable wireless protocols, as desired.

The building 2 may be further provided with additional network connected or "smart" devices (e.g., WiFi enabled), also known as Internet of Things (IoT) devices. These devices may include lighting 40, home appliances 18 (such as, but not limited to, robotic vacuums, coffee pots, etc.), water heaters 16, voice activated smart speakers (e.g., AMAZON ECHO™ or GOOGLE HOME™), WiFi enabled power outlets, garage door openers, door locks, televisions, speakers, doorbells, water valves, video cameras, wearable devices, etc. Other devices in the building 2 may include, but are not limited to, a radiofrequency receiver, a thermal imager, a radar device, a lidar device, an ultrasound device, etc. It is contemplated that the additional network connected devices may be in communication with or configured to communicate or interface with the HVAC controller 22 and/or the central security controller 38. In some instances, the additional network connected devices may have one or more individual controllers which in turn communicate with the HVAC controller and/or the security controller 38.

Figure 2:
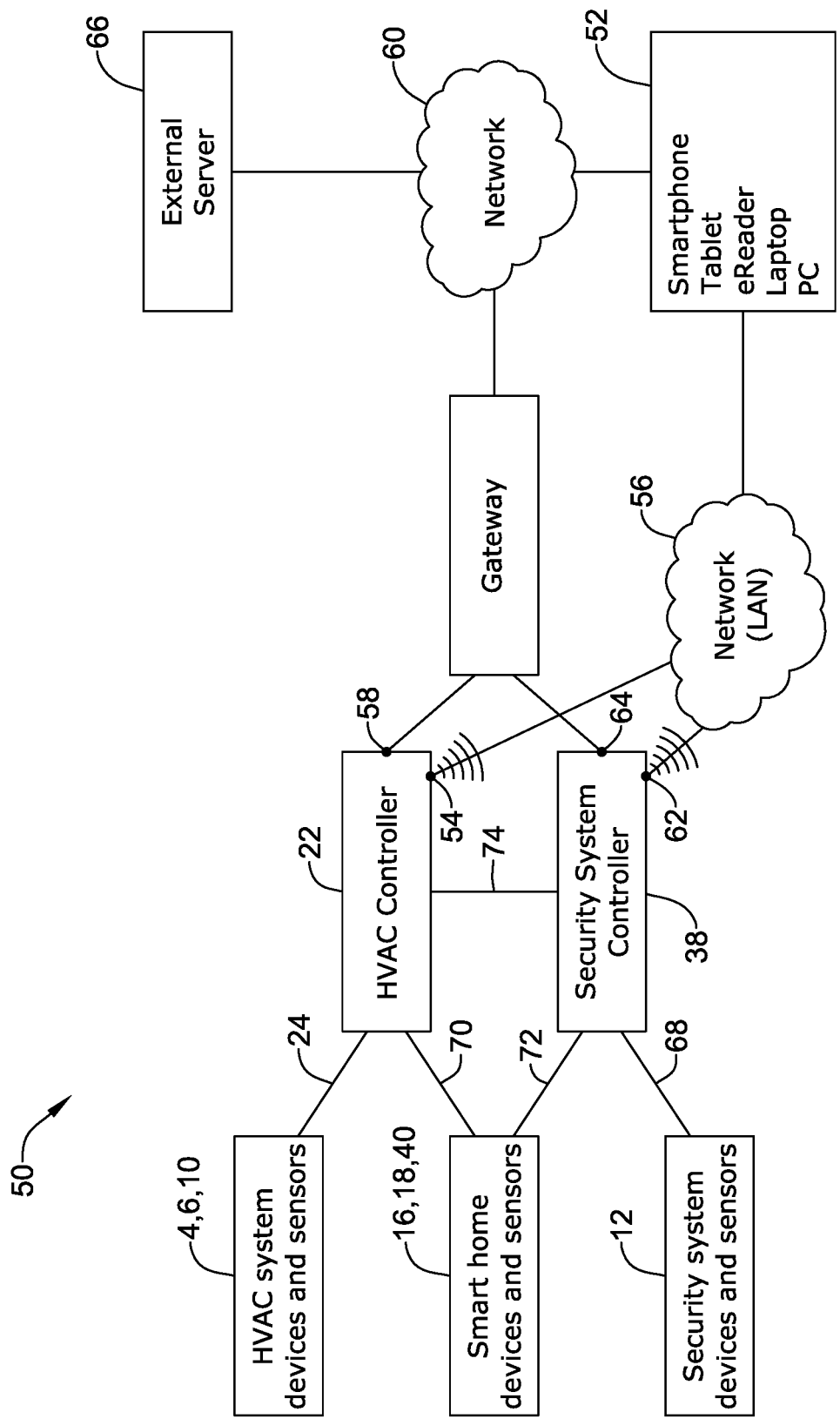
FIG. 2 is a schematic block diagram of an illustrative home or building automation system in communication with illustrative external devices and networks.

FIG. 2 is a schematic view of a home automation system 50 that facilitates remote access to, control of, and/or external communication to/from the HVAC system 4, the security system 14, and/or other home automation devices 16, 18, 40 shown in FIG. 1. The home automation system 50 may be considered a building control system or part of a building control system. The illustrative home automation system 50 includes an HVAC controller, for example, controller 22 (see FIG. 1), that is configured to communicate with and control one or more HVAC components 6 of the HVAC system 4 and a security system controller 38 (see FIG. 1) that is configured to communicate with and control one or more security sensors and/or devices 12. As discussed above, the controllers 22, 38 may be provided as separate and discrete control units or combined into a single control unit, as desired. Further, while not explicitly shown, the smart home devices and sensors 16, 18, 40 may communicate with control programs or controllers which in turn communicate with the HVAC controller 22 and/or security system controller 38. Alternatively, the smart home devices and sensors 16, 18, 40 may be configured to communicate directly with the HVAC controller 22 and/or security system controller 38.

The HVAC controller 22 may communicate with the one or more HVAC components 6 of the HVAC system 4 via a wired or wireless link 24 and with the smart home devices and sensors 16, 18, 40 (and/or the control programs thereof) via a wired or wireless link 70. Similarly, the security system controller 38 may communicate with one or more security sensors and/or devices 12 via a wired or wireless link 68 and with the smart home devices and sensors 16, 18, 40 (and/or the control programs thereof) via a wired or wireless link 72. If provided separately, it is not required for both the HVAC controller 22 and the security system controller 38 to be in communication with the smart home devices and sensors 16, 18, 40 (and/or the control programs thereof). For example, the HVAC controller 22 and the security system controller 38 may be in communication with one another via a wired or wireless link 74 such that information may be passed between the HVAC controller 22 and the security system controller 38.

Additionally, the controllers 22, 38 may communicate over one or more wired or wireless networks that may accommodate remote access and/or control of the controllers 22, 38 via another device 52 such as a smart phone, tablet, e-reader, laptop computer, personal computer, key fob, or the like. As shown in FIG. 2, the HVAC controller 22 may include a first communications port 54 for communicating over a first network 56, and in some cases, a second communications port 58 for communicating over a second network 60. Similarly, the security system controller 38 may include a first communications port 62 for communicating over the first network 56, and in some cases, a second communications port 64 for communicating over the second network 60. In some cases, the first network 56 may be a wireless local area network (LAN), and the second network 60 (when provided) may be a wide area network or global network (WAN) including, for example, the Internet. In some cases, the wireless local area network 56 may provide a wireless access point and/or a network host device that is separate from the controllers 22, 38. In other cases, the wireless local area network 56 may provide a wireless access point and/or a network host device that is part of at least one of the controller 22, 38. In some cases, the wireless local area network 56 may include a local domain name server (DNS), but this is not required for all embodiments. In some cases, the wireless local area network 56 may be an ad-hoc wireless network, but this is not required.

In some cases, the controllers 22, 38 may be programmed to communicate over the second network 60 with an external web service hosted by one or more external web servers 66. A non-limiting example of such an external web service is Honeywell's LCBS Connect™ web service. The controllers 22, 38 may be configured to upload selected data via the second network 60 to the external web service 66 where it may be collected, stored, and/or analyzed on the external web server 66. In some cases, the data may be indicative of the performance of the HVAC system 4, the security system 14, and/or the smart home devices and sensors 16, 18, 40. In other cases, the data may be indicative of building activity or lack thereof. Additionally, the controllers 22, 38 may be configured to receive and/or download selected data, settings, and/or services sometimes including software updates from the external web service over the second network 60. The data, settings and/or services may be received automatically from the web service, downloaded periodically in accordance with a control algorithm, and/or downloaded in response to a user request. In some cases, for example, the HVAC controller 22 may be configured to receive and/or download an HVAC operating schedule and operating parameter settings such as, for example, temperature set points, humidity set points, start times, end times, schedules, window frost protection settings, and/or the like from the web server 66 over the second network 60. In some instances, the controllers 22, 38 may be configured to receive one or more user profiles having at least one operational parameter setting that is selected by and reflective of a user's preferences. In still other instances, the controllers 22, 38 may be configured to receive and/or download firmware and/or hardware updates such as, for example, device drivers from the web server 66 over the second network 60. Additionally, the controllers 22, 38 may be configured to receive local weather data, weather alerts and/or warnings, major stock index ticker data, and/or news headlines over the second network 60. These are just some examples.

Depending upon the application and/or where the home automation user is located, remote access and/or control of the controllers 22, 38 may be provided over the first network 56 and/or the second network 60. A variety of remote wireless devices 52 may be used to access and/or control the controllers 22, 38 from a remote location (e.g. remote from the controllers 22, 38) over the first network 56 and/or second network 60 including, but not limited to, mobile phones including smart phones, tablet computers, laptop or personal computers, wireless network-enabled key fobs, e-readers, and/or the like. In many cases, the remote wireless devices 52 are configured to communicate wirelessly over the first network 56 and/or second network 60 with the controllers 22, 38 via one or more wireless communication protocols including, but not limited to, cellular communication, ZigBee, REDLINK™, Bluetooth, WiFi, IrDA, dedicated short range communication (DSRC), EnOcean, and/or any other suitable common or proprietary wireless protocol, as desired.

In some cases, one or more application program codes (i.e., apps) stored in the memory of the remote device 52 may be used to remotely access and/or control the controllers 22, 38. Similarly, an application program code (app) may be used to remotely access and/or control the smart home devices and sensors 16, 18, 40. The application program code (app) may be provided for downloading from an external web service, such as the web service hosted by the external web server 66 (e.g., Honeywell's LCBS Connect™ web service) or another external web service (e.g., ITUNES® or Google Play). In some cases, the app may provide a remote user interface for interacting with the controllers 22, 38 and/or smart home devices and sensors 16, 18, 40 at the user's remote device 52. For example, through the user interface provided by the app(s), a user may be able to change the operating schedule and operating parameter settings such as, for example, temperature set points, humidity set points, start times, end times, schedules, window frost protection settings, accept software updates and/or the like. Additionally, through the user interface provided by the app(s) the user may be able to arm and/or disarm the security system 14, view sensor status, view live or previously captured videos or still images and/or the like. Further, through the user interface provided by the app(s) the user may be able to view the status of the smart home devices and sensors 16, 18, 40, change a state of the smart home devices and sensors 16, 18, 40 (e.g., turn on/off), change a control parameter (e.g., a water heater temperature set point), and/or the like.

Communications may be routed from the user's remote device 52 to the web server 66 and then, from the web server 66 to the appropriate controller 22, 38. In some cases, communications may flow in the opposite direction such as, for example, when a user interacts directly with the controllers 22, 38 to change an operating parameter setting such as, for example, a schedule change or a set point change, or an association of a security system sensor 12 with an arming mode, etc. The change made at the appropriate controller 22, 38 may then be routed to the web server 66 and then from the web server 66 to the remote device 52 where it may reflected by the application program(s) executed by the remote device 52. In some cases, one or both controllers 22, 38 may be used to change an operating parameter in the smart home devices and sensors 16, 18, 40.

In other cases, a user may be able to interact with the controllers 22, 38 via a user interface provided by one or more web pages served up by the web server 66. The user may interact with the one or more web pages using a variety of internet capable devices to effect a change at the controllers 22, 38 as well as view usage data and energy consumption date related to the usage of the HVAC system 4, security events or status related to the security system 12, and/or information regarding the smart home devices and sensors. In still yet another case, communication may occur between the user's remote device 52 and the controllers 22, 38 without being relayed through a server. These are just some examples.

Figure 3:
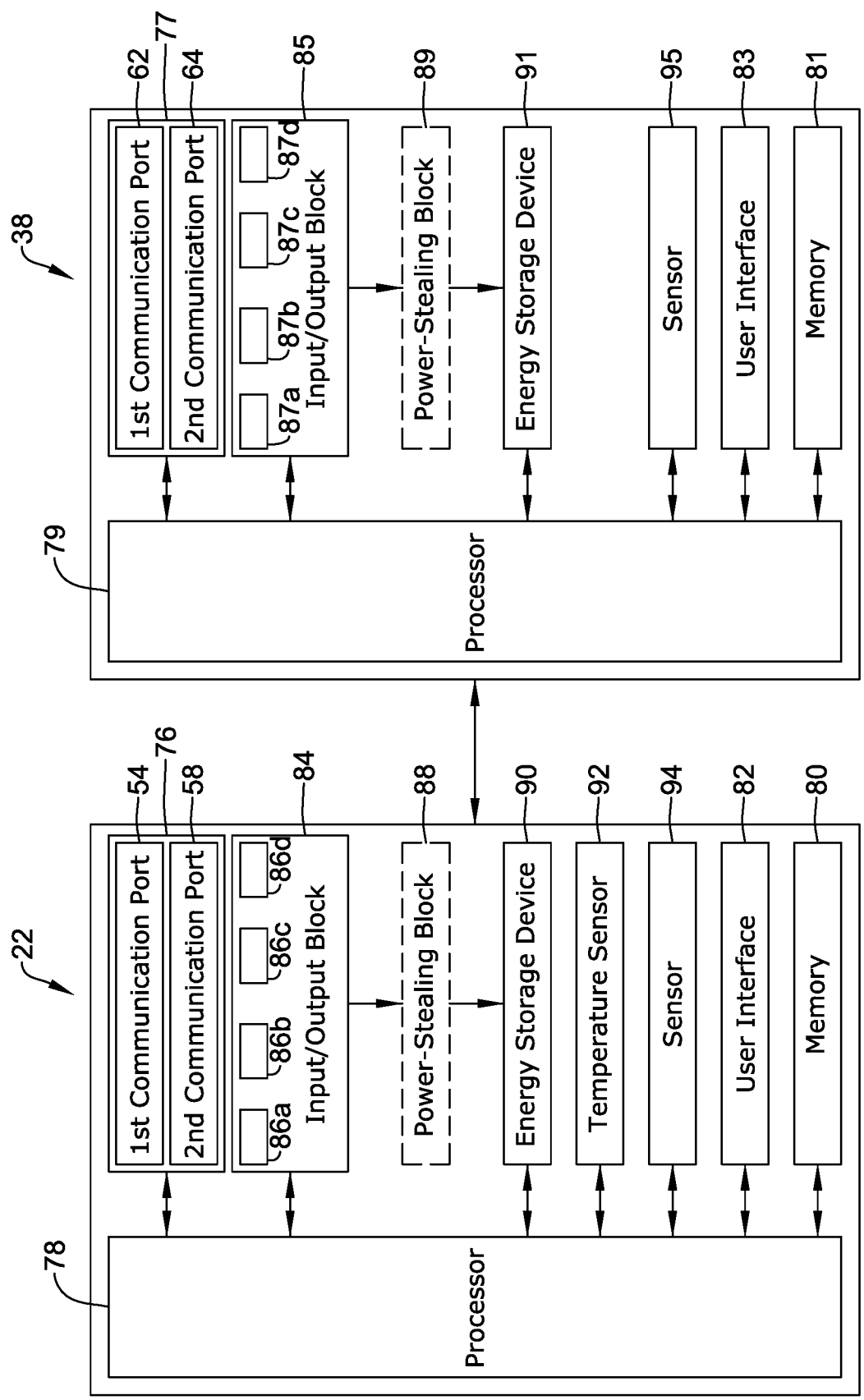
FIG. 3 is a schematic block diagram of first and second illustrative controllers.

FIG. 3 is an illustrative schematic block diagram of the HVAC controller 22 in communication with the security system controller 38 of FIG. 2. As discussed above with reference to FIG. 2, the HVAC controller 22 and/or the security system controller 38 may be accessed and/or controlled from a remote location over the first network 56 and/or the second network 60 using a remote wireless device 52 such as, for example, a smart phone, a tablet computer, a laptop or personal computer, a wireless network-enabled key fob, an e-reader, and/or the like. In some instances, the HVAC controller 22 may be a thermostat, but this is not required. As shown in FIG. 3, the HVAC controller 22 and the security system controller 38 may each include a communications block 76, 77 having a first communications port 54, 62 for communicating over a first network (e.g., a wireless LAN) and a second communications port 58, 64 for communicating over a second network (e.g., a WAN or the Internet). The first communications port 54, 62 can be a wireless communications port including a wireless transceiver for wirelessly sending and/or receiving signals over a first wireless network 56. Similarly, the second communications port 58, 64 may be a wireless communications port including a wireless transceiver for sending and/or receiving signals over a second wireless network 60. In some cases, the second communications port 58, 64 may be in communication with a wired or wireless router or gateway for connecting to the second network, but this is not required. In some cases, the router or gateway may be integral to (e.g., within) the HVAC controller 22 and/or the security system controller 38 or may be provided as a separate device. Additionally, the illustrative HVAC controller 22 and the security system controller 38 may each include a processor (e.g., microprocessor, microcontroller, etc.) 78, 79 and a memory 80, 81. The HVAC controller 22 and the security system controller 38 may each also include a user interface 82, 83, but this is not required. In some cases, only one of the HVAC controller 22 or the security system controller 38 may be provided with a user interface 82, 83. In some cases, one or both of the HVAC controller 22 and the security system controller 38 may include a timer (not shown). The timer may be integral to the processor 78, 79 or may be provided as a separate component. The respective memory 80, 81 of the illustrative HVAC controller 22 and the security system controller 38 may be in communication with the respective processor 78, 79. The memory 80, 81 may be used to store any desired information, such as the aforementioned control algorithm, set points, schedule times, diagnostic limits such as, for example, differential pressure limits, delta T limits, security system arming modes, and the like. The memory 80, 81 may be any suitable type of storage device including, but not limited to, RAM, ROM, EPROM, flash memory, a hard drive, and/or the like. In some cases, the processor 78, 79 may store information within the memory 80, 81, and may subsequently retrieve the stored information from the memory 80, 81.

In many cases, the HVAC controller 22 may include an input/output block (I/O block) 84 having a number of wire terminals (e.g. 86a-86d) for receiving one or more signals from the HVAC system 4 and/or for providing one or more control signals to the HVAC system 4. For example, the I/O block 84 may communicate with one or more HVAC components 6 of the HVAC system 4. The HVAC controller 22 may have any number of wire terminals for accepting a connection from one or more HVAC components 6 of the HVAC system 4. However, how many wire terminals are utilized and which terminals are wired is dependent upon the particular configuration of the HVAC system 4. Different HVAC systems 4 having different HVAC components and/or type of HVAC components 6 may have different wiring configurations. As such, an I/O block 84 having four wire terminals, as shown in FIG. 3, is just one example and is not intended to be limiting. In some cases, the I/O block 84 may be configured to receive wireless signals from one or more HVAC components 6 or sensors 10. Alternatively, or in addition to, the I/O block 84 may communicate with another controller, which is in communication with one or more HVAC components of the HVAC system 4, such as a zone control panel in a zoned HVAC system, equipment interface module (EIM) (e.g. EIM 34 shown in FIG. 1) or any other suitable building control device. It is further contemplated that the I/O block 84 may communicate with another controller which controls a separate building control system, such as, but not limited to the security system controller 38.

Similarly, the security system controller 38 may include an input/output block (I/O block) 85 having a number of wire terminals (e.g. 87a-87d) for receiving one or more signals from the security system 12 and/or for providing one or more control signals to the security system 12. For example, the I/O block 85 may communicate with one or more sensors 12 of the security system 14. The security system controller 38 may have any number of wire terminals for accepting a connection from one or more sensors 12 of the security system 14. However, how many wire terminals are utilized and which terminals are wired is dependent upon the particular configuration of the security system 14. As such, an I/O block 85 having four wire terminals, as shown in FIG. 3, is just one example and is not intended to be limiting. In some cases, the I/O block 85 may be configured to receive wireless signals from one or more security sensors 12. Alternatively, or in addition to, the I/O block 85 may communicate with another controller, which is in communication with one or more controllers which controls a separate building control system, such as, but not limited to the HVAC controller 22.

In some cases, a power-transformation block 88, 89 may be connected to one or more wires of the I/O block 84, 85, and may be configured to bleed or steal energy from the one or more wires of the I/O block 84, 85. The power bled off of the one or more wires of the I/O block may be stored in an energy storage device 90, 91 that may be used to at least partially power the HVAC controller 22 or the security system controller 38. In some cases, the energy storage device 90, 91 may be capacitor or a rechargeable battery. In addition, the HVAC controller 22 and/or the security system controller 38 may also include a back-up source of energy such as, for example, a battery that may be used to supplement power supplied to the HVAC controller 22 or the security system controller 38 when the amount of available power stored by the energy storage device 90, 91 is less than optimal or is insufficient to power certain applications. Certain applications or functions performed by the HVAC controller 22 or the security system controller 38 may require a greater amount of energy than others. If there is an insufficient amount of energy stored in the energy storage device 90, 91, then, in some cases, certain applications and/or functions may be prohibited by the processor 78, 79.

The HVAC controller 22 may also include one or more sensors such as for example, a temperature sensor, a humidity sensor, an occupancy sensor, a proximity sensor, and/or the like. In some cases, the HVAC controller 22 may include an internal temperature sensor 92, as shown FIG. 3, but this is not required. The HVAC controller 22 may also communicate with one or more remote temperature sensors, humidity sensors, and/or occupancy sensors 10 located throughout the building or structure. Additionally, the HVAC controller may communicate with a temperature sensor and/or humidity sensor located outside of the building or structure for sensing an outdoor temperature and/or humidity if desired.

In some cases, the HVAC controller 22 may include a sensor 94 that is configured to determine if a user is in proximity to the building controller. Similarly, the security system controller 38 may include a sensor 95 that is configured to determine if a user is in proximity to the security system controller 38. In some cases, the sensor 94, 95 may be a motion sensor or a proximity sensor such as, for example, a passive infrared (PIR) sensor. In certain cases in which the sensor 94, 95 is a motion sensor or a proximity sensor, the sensor 94, 95 may be located remotely from the HVAC controller 22 and/or the security system controller 38 and may be in wireless communication with the HVAC controller 22 and/or the security system controller 38 via one of the communication ports.

In yet another example, the sensor 94, 95 may be configured to determine that the user is in proximity to or is expected to be in proximity to the HVAC controller 22 and/or the security system controller 38 upon detecting that the user's remote device 52 is connected to the building's wireless network which, in some cases, may be the same network to which the HVAC controller 22 and/or the security system controller 38 is also connected. Such functionality is shown and described in U.S. Patent Publication No. 2014/0031989 entitled "HVAC CONTROLLER WITH WIRELESS NETWORK BASED OCCUPANCY DETECTION AND CONTROL", the entirety of which is incorporated by reference herein for all purposes.

In still other cases, the user's remote device 52 may be configured to determine that a user is in proximity to the HVAC controller 22 and/or the security system controller 38 upon sensing a user's interaction with the HVAC controller 22 and/or the security system controller 38 via the user interface provided at the HVAC controller 22 and/or the security system controller 38. For example, the sensor 94, 95 may be configured to sense when the screen of the user interface 82, 83 is touched and/or when a button provided at the user interface 82, 83 is pressed by a user. In some cases, the sensor 94, 95 may be a touch sensitive region provided on the user interface 82, 83 when the user interface 82, 83 incorporates a touch screen display. In other cases, the sensor 94, 95 may be associated with a hard button or soft key that is provided separate from a display of the user interface 82, 83.

In some cases, upon detecting or determining that a user is in proximity to the HVAC controller 22 and/or the security system controller 38, the sensor 94,95 may deliver a signal to the processor 78, 79 indicating that the user is in proximity to the HVAC controller 22 or the security system controller 38. In other cases, upon detecting or determining that a user is in proximity to the HVAC controller 22 or the security system controller 38, the sensor 94, 95 may be configured to transmit a signal to a remote server 66 over a second network 60 via the communications block 76, 77.

The user interface 82, 83, when provided, may be any suitable user interface that permits the HVAC controller 22 or the security system controller 38 to display and/or solicit information, as well as accept one or more user interactions with the HVAC controller 22 or the security system controller 38. For example, the user interface 82, 83 may permit a user to locally enter data such as temperature set points, humidity set points, starting times, ending times, schedule times, diagnostic limits, responses to alerts, associate sensors to alarming modes, and the like. In one example, the user interface 82, 83 may be a physical user interface that is accessible at the HVAC controller 22 or the security system controller 38, and may include a display and/or a distinct keypad. The display may be any suitable display. In some instances, a display may include or may be a liquid crystal display (LCD), and in some cases an e-ink display, fixed segment display, or a dot matrix LCD display. In other cases, the user interface 82, 83 may be a touch screen LCD panel that functions as both display and keypad. The touch screen LCD panel may be adapted to solicit values for a number of operating parameters and/or to receive such values, but this is not required. In still other cases, the user interface 82, 83 may be a dynamic graphical user interface.

In some instances, the user interface 82, 83 need not be physically accessible to a user at the HVAC controller 22 or the security system controller 38. Instead, the user interface 82, 83 may be a virtual user interface 82, 83 that is accessible via the first network 56 and/or second network 60 using a mobile wireless device such as one of those remote devices 52 previously described herein. In some cases, the virtual user interface 82, 83 may be provided by an app or apps executed by a user's remote device for the purposes of remotely interacting with the HVAC controller 22 or the security system controller 38. Through the virtual user interface 82, 83 provided by the app on the user's remote device 52, the user may change temperature set points, humidity set points, starting times, ending times, schedule times, diagnostic limits, respond to alerts, update their user profile, view energy usage data, arm or disarm the security system, configured the alarm system, and/or the like. In some instances, changes made to the HVAC controller 22 or the security system controller 38 via a user interface 82, 83 provided by an app on the user's remote device 52 may be first transmitted to an external web server 66. The external web server 66 may receive and accept the user inputs entered via the virtual user interface 82, 83 provided by the app on the user's remote device 52, and associate the user inputs with a user's account on the external web service. If the user inputs include any changes to the existing control algorithm including any temperature set point changes, humidity set point changes, schedule changes, start and end time changes, window frost protection setting changes, operating mode changes, and/or changes to a user's profile, the external web server 66 may update the control algorithm, as applicable, and transmit at least a portion of the updated control algorithm over the second network 60 to the HVAC controller 22 or the security system controller 38 where it is received via the second port 58, 64 and may be stored in the memory 80, 81 for execution by the processor 78, 79. In some cases, the user may observe the effect of their inputs at the HVAC controller 22 or the security system controller 38.

Rather than a dedicated app, the virtual user interface 82, 83 may include one or more web pages that are transmitted over the second network 60 (e.g. WAN or the Internet) by an external web server (e.g., web server 66). The one or more web pages forming the virtual user interface 82, 83 may be hosted by an external web service and associated with a user account having one or more user profiles. The external web server 66 may receive and accept user inputs entered via the virtual user interface and associate the user inputs with a user's account on the external web service. If the user inputs include changes to the existing control algorithm including any temperature set point changes, humidity set point changes, schedule changes, start and end time changes, window frost protection setting changes, operating mode changes, and/or changes to a user's profile, the external web server 66 may update the control algorithm, as applicable, and transmit at least a portion of the updated control algorithm over the second network 60 to the HVAC controller 22 or the security system controller 38 where it is received via the second port 58, 64 and may be stored in the memory 80, 81 for execution by the processor 78, 79. In some cases, the user may observe the effect of their inputs at the HVAC controller 22 or the security system controller 38.

In some cases, a user may use either the user interface 82, 83 provided at the HVAC controller 22 or the security system controller 38 and/or a virtual user interface 82, 83 as described herein. The two types of user interfaces 82, 83 that may be used to interact with the HVAC controller 22 or the security system controller 38 are not mutually exclusive of one another. However, in some cases, a virtual user interface 82, 83 may provide more advanced capabilities to the user. It is further contemplated that a same virtual user interface 82, 83 for both the HVAC controller 22 and the security system controller 38. Further, as described above, the HVAC controller 22 and the security system controller 38 may be formed as a single controller configured to perform the functions of both the HVAC controller 22 and the security system controller 38 from a single device.

Figure 4:
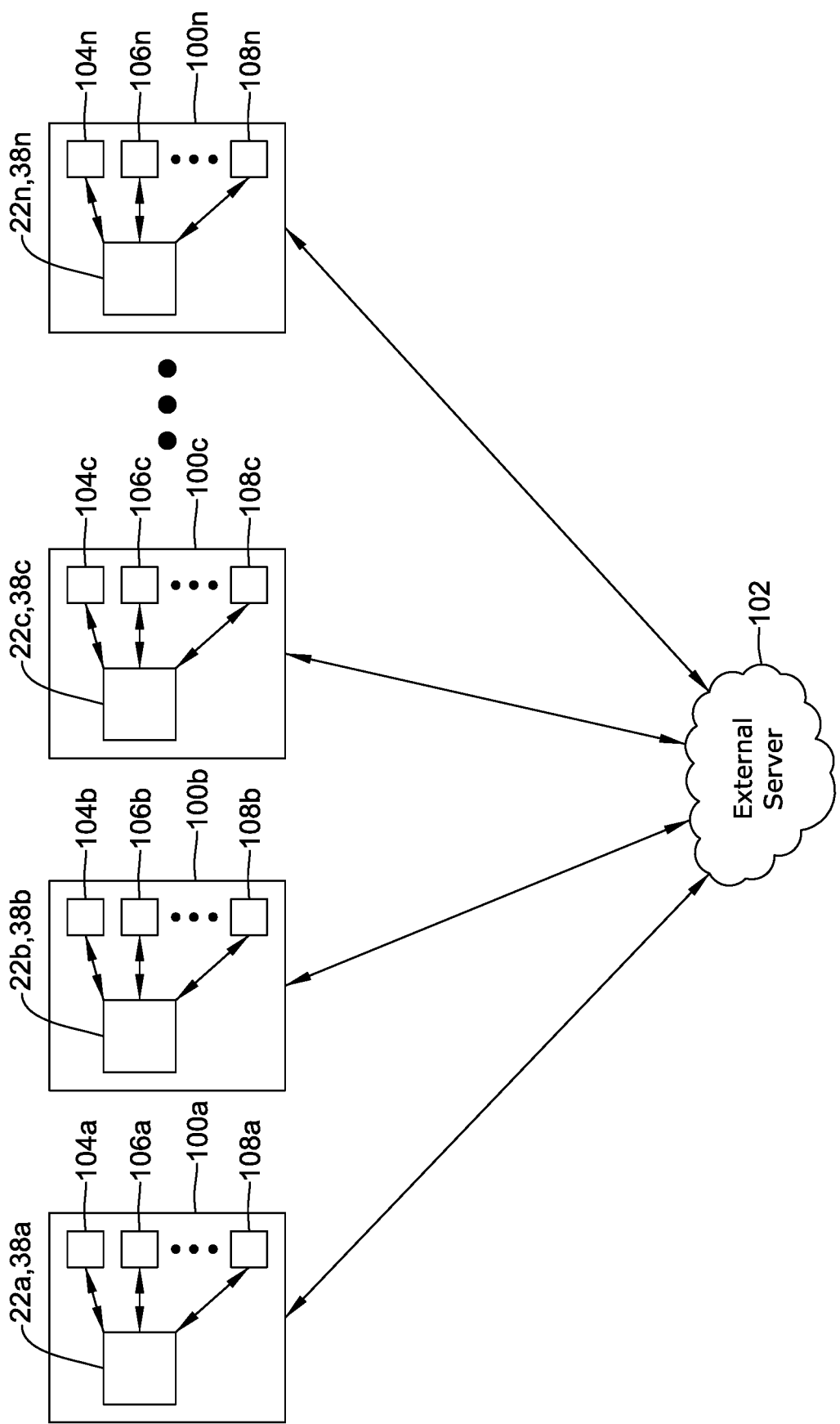
FIG. 4 is a schematic block diagram of a plurality of controllers in communication with an external server.

FIG. 4 is a schematic diagram of a plurality of buildings 100*a*, 100*b*, 100*c*, 100*n* (collectively, 100) each having one or more HVAC controllers 22*a-n* and/or security system controllers 38*a-n* in communication with an external web server 102, such as the external web server 66 described herein. It is contemplated that devices from any number of buildings 100 may be providing information to the external server 102. In some cases, hundreds, thousands, tens of thousands, or more buildings may be in communication with the external web server 102. The buildings 100a-n may each have one or more of: an HVAC system 104a-n, a security system 106a-n, or a smart home device, appliance, or sensor 108a-n such as any of those described above with respect to FIG. 1. The HVAC system 104a-n, security system 106a-n, and/or smart home devices 108a-n may be in communication with the HVAC controller 22a-n, security system controller 38a-n, a combined HVAC and security controller, or other controller configured to operate the systems and devices within the respective building 102a-n. The controllers 22a-n, 38a-n from each building may then relay performance data, operating parameters, alarm conditions, gas and/or electricity usage, etc. to the external server 102. In some cases, the data may be relayed through a WAN to the external server 102. In some cases, the external server 102 may be configured to aggregate the data obtained from the individual buildings 100. As will be described in more detail herein, once aggregated, the data can be analyzed for trends, to identify outliers, to improve algorithms, etc.

It is contemplated that the HVAC sensors 10, security system sensors 12, and/or smart home devices and sensors 16, 18, 40 may each be configured to issue an alert or send a notification to a user when they are activated. For example, when a person arrives home an outdoor motion camera may detect motion, the garage door may open, the user may open a door connected to the security system, the user's devices may connect to the local network, and an indoor camera may detect motion, etc. The data generated from the sensors and devices may be combined to correlate certain sensor or device data with a specific action. This may allow the building automation system to send a single notification indicated that a person has arrived home rather than a plurality of notifications indicating all of the sensor triggers that have occurred as the person arrives and enters the home.

Figure 5:
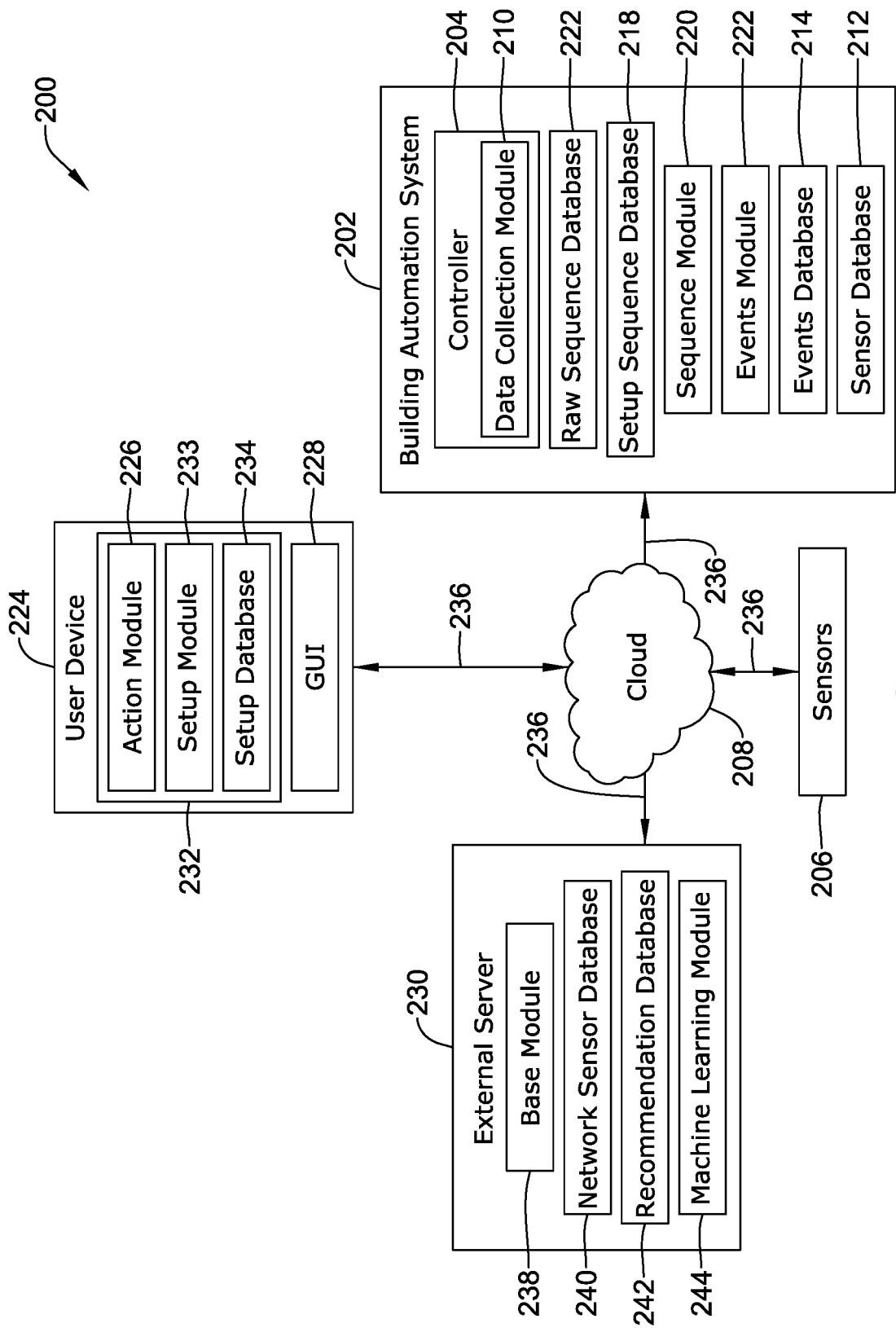
FIG. 5 is schematic block diagram of an illustrative building automation system including multi-factor event sequencing and analytics.

FIG. 5 is a block diagram of an illustrative building automation system 200 including multi-factor event sequencing and analytics. The system 200 may include one or more building automation systems 202 positioned within or around a building or residence. The building automation system(s) 202 may include, but are not limited to, an HVAC system, a lighting control system, a fire suppression system, a security system, internet enabled or "smart" devices, etc. The building automation system(s) 202 include at least one controller 204, such as, but not limited to, an HVAC controller 22 and/or a security system controller 38 described herein. The controller 204 may be similar in form and function to the controllers 22, 38 described above and include the same or similar components and capabilities. The controller 204 is configured to be in communication with one or more sensors 206 that may be used to detect a condition within or near a space of the building having the building automation system(s) 202. In some embodiments, the controller 204 may be in communication with the sensors 206 via a cloud network 208. In other embodiments, the controller 204 may be in communication with the sensors 206 via a local network (not explicitly shown) or in direct communication (e.g., via a wired connection), as desired. The sensors 206 may be any type of sensor, device (including IoT devices), or detectable event suitable for operation in or use within a building automation system. The sensors 206 may include, but are not limited to, temperatures sensors, humidity sensors, carbon dioxide sensors, occupancy sensors, proximity sensors, motion sensors, limit switches, noise sensors or microphones, video cameras, still image cameras, a horn or alarm, fire, smoke, water, carbon monoxide, and/or natural gas detectors, a damper actuator controller (e.g. that closes a damper during a fire event), connection or disconnection of a device to a network, activation and/or deactivation of IoT devices, passcode entry, a light controller, smart light bulbs, home appliances such as, but not limited to, robotic vacuums, coffee pots, etc., water heaters, voice activated smart speakers (e.g., AMAZON ECHO™ or GOOGLE HOME™), WiFi enabled power outlets, garage door openers, door locks, televisions, speakers, doorbells, water valves, video cameras, wearable devices, radiofrequency receivers, thermal imagers, radar devices, lidar devices, ultrasound devices, etc.

The controller 204 may include a data collection module 210 which may receive data (e.g., the sensed condition) from the sensors 206. In some embodiments, the data collection module 210 may be a separate portion of the controller 204, although this is not required. The building automation system(s) 202 may maintain a plurality of databases including from data obtained from the sensors 206 and information derived from the sensors 206. A first, or sensor, database 212 may include data obtained from the one or more sensors 206. A second, or events, database 214 may include a list of sensor data (e.g., sensed conditions) that occurred in a specific sequence and in a specific time range that can be defined as one event. A third, or raw sequence, database 216 may include data obtained from the one or more sensors 206 aggregated by a predetermined time range. A fourth, or set up sequence, database 218 may include data that has been recorded for a specific action and initiated by the user. A memory accessible by the processor of the controller 204 may be configured to store the sensor database 212, the events database 214, the raw sequence database 216, and the set-up sequence database such that historical and current data is readily accessible. The controller 204 may also include a sequence module 220 which may be configured to help assist the user in identifying and establishing a series of sensor data that can be linked to a specific action such as, but not limited to, a user returning home, as will be described in more detail herein. The controller 204 may further include an events module 222 which is configured to compare sensor data to the events database 214 to identify actions. The events module 222 may also be configured to transmit a notification to a remote user device 224 when an action occurs.

The remote device 224 may be any internet connected device including a smart phone, tablet, e-reader, laptop computer, personal computer, etc. The notification may be received by an action module 226 within the remote device 224. The action module 226 may receive the sequence of sensor data from the events module 222 and display the action on a display or guided user interface (GUI) 228 of the user device 224. The action module 226 may further compare the sequence of sensor data to an external network or server 230 to determine if there are any recommendations that may be applied to define a sequence using the received data. The action module 226 may be a part of an application program code (app) 232, although this is not required. The app 232 may also include a setup module 233 configured to allow a user to initiate a learning or programming mode to connect an action with a sequence of data points (e.g., sensed conditions) from one or more sensors 206. The actions and the associated data may be stored in a setup database 234 on the user device 224 within a memory of the device 224 and associated with the app 232. It is contemplated that the user may customize who or what device receives notifications and when notifications are sent or received via the user app 232 or controller 204. For example, the home automation system 202 may be in communication with more than one user and/or more than one user device. Once the notification has been received at the action module 226, the notification may be displayed on a user interface 228 of the device 224. In some cases, an audio alert (e.g., a beep or chime) or a haptic alert (e.g., a vibration) may accompany the notification to alert the user of the notification.

The system 200 may further include one or more external servers 230. The building automation system 202, the remote user device 224, sensors 206 and external server 230 may communicate with one another via a network 236. The network 236 may be a wide area network or global network (WAN), such as the internet. The external server(s) 230 may be a suite of hardware and software which may sometimes be referred to as "the cloud." In some cases, the communication may pass through an intermediary server 208 or cloud network, but this is not required. In some cases, the cloud 208 may provide the ability for communication amongst the home automation system(s) 202, sensors 206, the external server(s) 230, and/or one or more remote devices 224. While the external server(s) 230 is illustrated as connected to a single building having a building automation system(s) 202, the external server(s) 230 may be connected to a plurality of building automation systems as described with respect to FIG. 4. The external server(s) 230 may collect and store data from the various sensors 206 from the one or more connected home automations systems 202. The data from the sensors 206 may be collected by a base module or controller 238 and stored in a sensor database 240 at the external server(s) 230.

The external server 230 may further include a recommendations database 242 which contains sequences of sensor data that can be defined as events. These sequences may be sent to the user as suggested sequences to be defined as events in an individual building automation system 202. The external server 230 may also include a machine learning module 244 which may use one or more correlation engines, to analyze and correlate the various sequences of the sensor data in order to determine if there is a correlation over time and if the sequence of sensor data is highly correlated the sequence of sensor data is stored in the recommendation database 242.

Generally, the building automation system 200 may use data from the sensors 206 that is typically collected within the building to determine if there is a single action that occurs (e.g., a user coming home) that triggers one or more sensors 206 by analyzing the sequence in which the sensors 206 are activated, deactivated, and/or collecting certain data points. The system 200 may perform machine learning (e.g., for example, at the external server(s) 230 using the machine learning modules 244) on raw sensor data to send recommendations to the user (e.g., at the user device 224 and/or the controller 204) to name or define an action for a specific sequence of sensor data. It is contemplated that actions may be user defined or suggested by the external server 230 and/or the controller 204. However, when an action is suggested by the external server 230 and/or the controller 204, the user may be required to approve and/or name the sequence. As will be discussed in more detail herein, the system 200 may continuously analyze the sensor data and determine if the data is part of a user defined named sequence or a machine learning named sequence.

Figure 6:
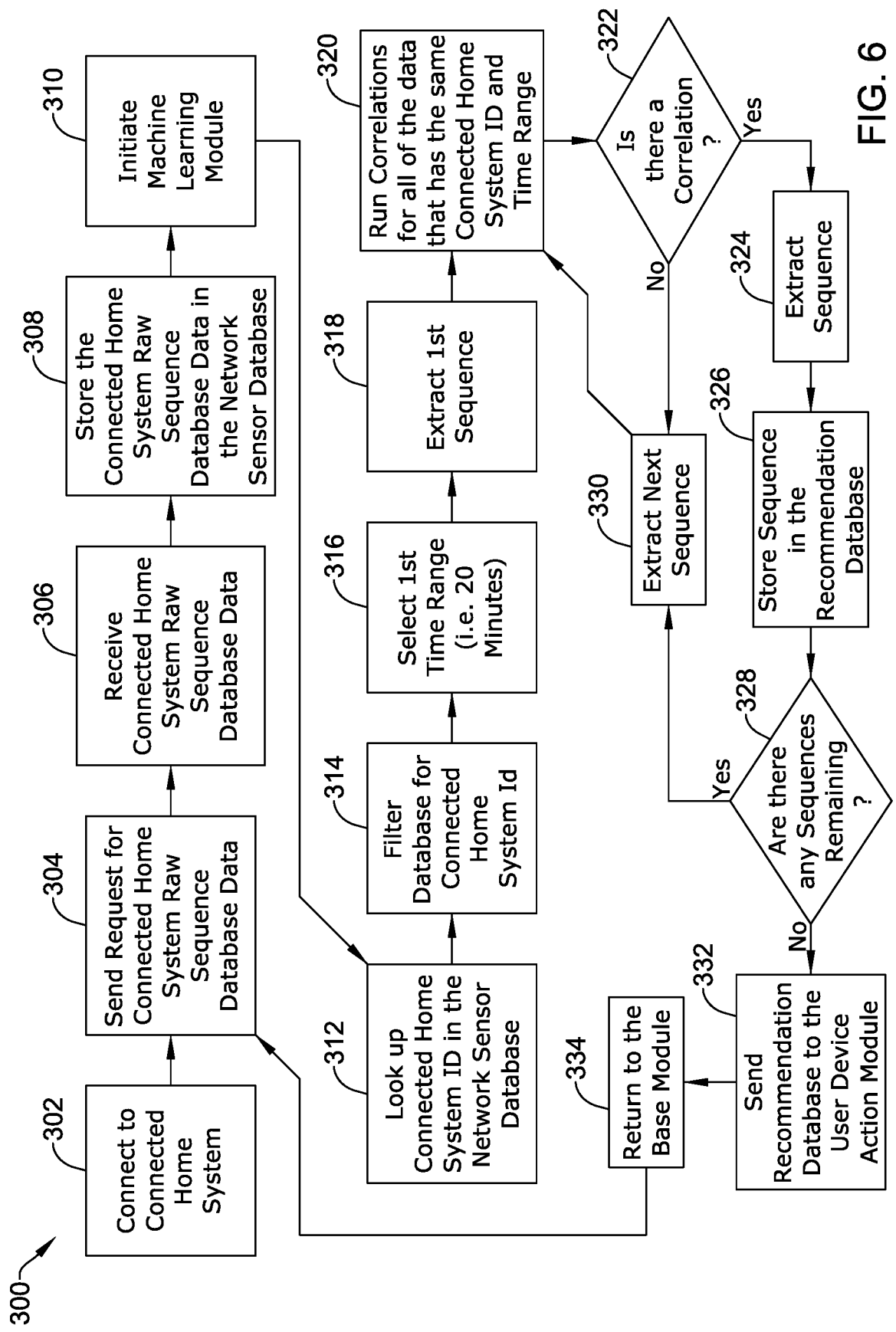
FIG. 6 is a flow chart an illustrative flow chart of a method of generating a recommended sequence of sensor data to a user to be defined as an event.

FIG. 6 is an illustrative flow chart of a method 300 of generating a recommended sequence of sensor data to a user to be defined as an event. The method 300 begins with the base module 238 of the external server 230 establishing a connection to the building automation system 202, as shown at block 302. The base module 238 may send a request for data to the raw sequence database 216 of the building automation system 202, as shown at block 304. The base module 238 may receive the raw sequence database data, as shown at block 306, and store said data in the network sensor database 240, as shown at block 308.

Figure 7:
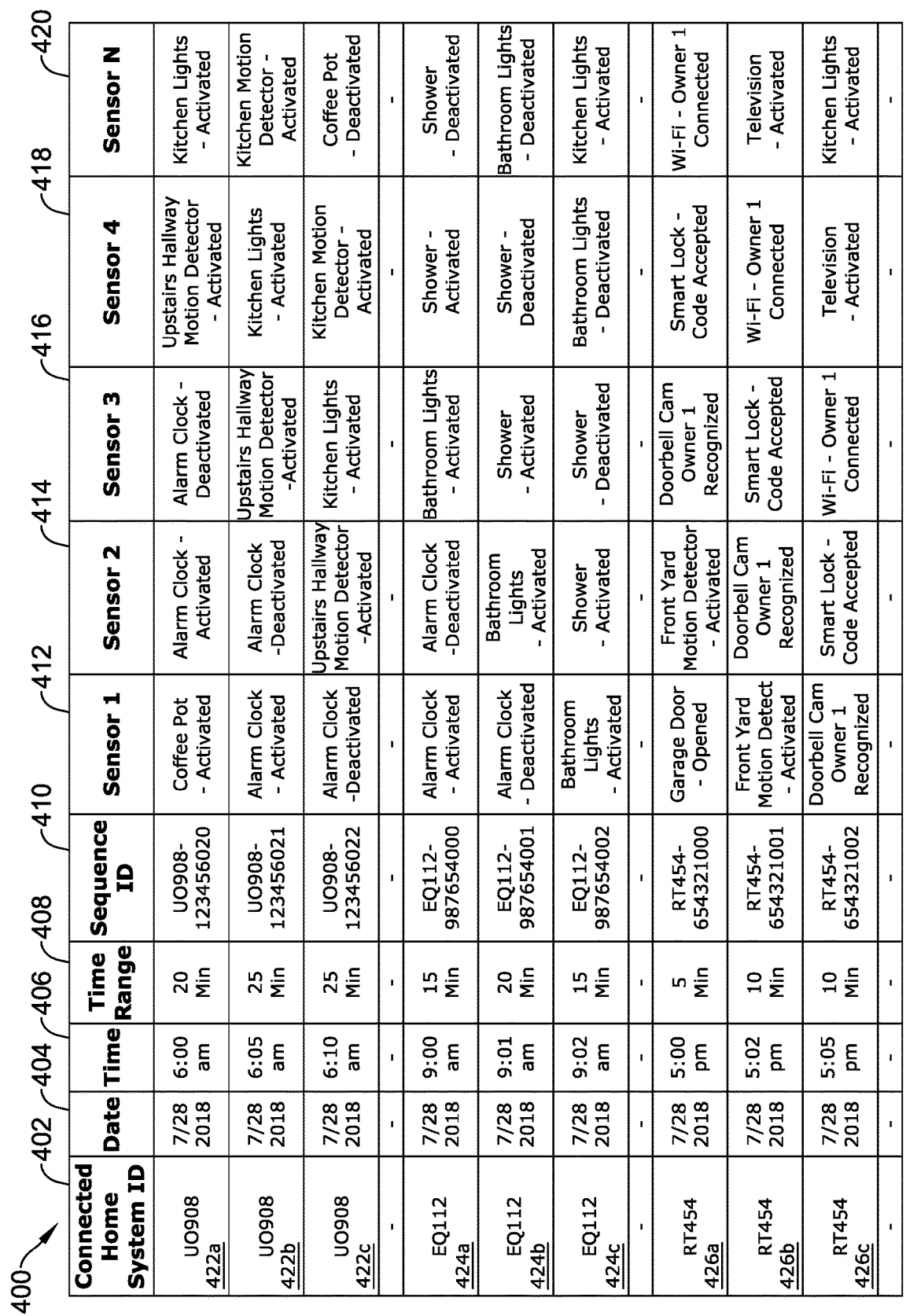
FIG. 7 is an illustrative network sensor database.

Referring briefly to FIG. 7, which illustrates an example network sensor database 400, the network sensor database 400 may contain all the sequence data collected from the various connected building systems and may record additional information beyond the measured or perceived perimeter. The network sensor database 400 may record the system or building identification 402. The building identification 402 may link or tie the data in the corresponding row to a particular controller 204 or building system 202 such that data can be aggregated with and/or distinguished from other systems. For example, the base module 238 and/or the machine learning module 244 of the external server(s) 230 may link home automations systems 202 have similar building characteristics (although other criteria may be used, as desired) such that the data can be aggregated and used to refine the sequence of sensor data used to suggest events, as will be described in more detail herein. The network sensor database 400 may also record the date 404 and the time 406 the sensor data was obtained. In some cases, a time range 408 over which the data has been collected may also be recorded. It is contemplated that the time range 408 may correspond to a length of time between the first sensor activation (or data recording) and the last sensor activation (or data recording) in the sequence of data readings. The network sensor database 400 may also record a sequence identification number 410. The sequence identification number 410 may include the system identification number 402 as well as a unique identifying number to link a sequence of sensor data readings to each other. The network sensor database 400 may also record a sensor name and corresponding data 412, 414, 416, 418, 420. While the illustrative network sensor database 400 shows five sensors for each sequence, it is contemplated that the sequence may have fewer than five or more than five sensor data readings, as desired. Further, each sequence does not necessarily include the same number of sensor data readings. For example, a first sequence may include four sensor data readings while another sequence may include six sensor data readings.

The illustrative network sensor database 400 shows data from three separate building systems or having three unique system identification numbers 402. For example, the first three rows of data 422a, 422b, 422c (collectively, 422) correspond to a first building system having an identification number 402 of "UO908". The next three rows of data 424a, 424b, 424c (collectively, 424) correspond to a second building system having an identification number 402 of "EQ112". The last three rows of data 426a, 426b, 426c (collectively, 426) correspond to a third building system having an identification number 402 of "RT454". While only 3 rows of data 422, 424, 426 are illustrated for each building system, it is contemplated that each building system may have any number of rows of data. For example, the amount of data generated for each building system may vary depending on the level of activity within said building system. Further, the network sensor database 400 may include sensor data from fewer than three or more than three building systems, as desired.

In some embodiments, the network sensor database 400 may include several sequences 410 which include overlapping sensor data points. For example, referring to rows 422, the sequence in the first row 422a begins at a time of 6:00 AM with the first sensor 412 data point being an activated coffeepot. The sequence in the second row 422b begins at a time of 6:05 AM with the first sensor data point 412 being an activated alarm clock. As can be seen, the activated alarm clock is the second sensor data point 414 in the first sequence 422a. It is contemplated that providing multiple sensor data sequence start and end points may allow for more accurate event recommendations. For example, a user may choose not to automatically brew coffee each morning. In which case, the first sensor data sequence 422a may not allow the building automation system 202 to reliably recognize the action (e.g., a person waking up), as a sensor data reading may be missing from the defined event. The sensor data readings illustrated in FIG. 7 are not intended to limit the order or type of information that can be used to define an event. Rather, the illustrated sensor data readings are provided to illustrate an example of some types of readings that can be used to suggest or recommend an event to a user.

Returning to FIG. 6, after the data has been stored, the base module 238 may then initiate or start the machine learning module 244, as shown at block 310. The machine learning module 244 may look up a specific building automation system 202 system identification in the network sensor database 240, as shown at block 312. The machine learning module 244 may filter the sensor database 240 for the specific building identification, as shown at block 314. This may allow the machine learning module 244 to look for sensor data sequences in a specific building automation system 202. For example, referring additionally to FIG. 7, the machine learning module may look up the building system identification number "UO908". The machine learning module 244 may then select a first-time range as shown at block 316. For example, the machine learning module 244 may select the time range of 20 minutes. Next, the machine learning module 244 may extract the first sequence having a time range of 20 minutes, as shown at block 318. Referring additionally to FIG. 7, the first sequence having a time range of 20 minutes and corresponding to the building system identification number "UO908" is shown in row 422a. The machine learning module 244 may then run a correlation analysis for all the data that has the same system identification and time range, as shown at block 320. The machine learning module 244 may then determine if there is a correlation among the sensor data that has the same system identification and time range as shown at block 322. In some cases, the data may be considered to be correlated if the linear regression analysis using the least-squares method results in a correlation factor above a predetermined threshold. The predetermined threshold may be any desired threshold, such as, but not limited to, 75% or greater (e.g., R=0.75 or greater), 85% or greater (e.g., R=0.85 or greater), 95% or greater (e.g., R=0.95 or greater), etc. These are just some examples.

If there is not a correlation, the machine learning module 244 may perform no action with the current sequence and extract another sequence for analysis, as shown at block 330. If there is a correlation, the machine learning module 244 may extract the sequence from the sensor database 240, as shown at block 324. The extracted sequence may then be stored in the recommendations database 242, as shown at block 326. Referring briefly to FIG. 8, which illustrates an example network recommendations database 500, the network recommendations database 500 may include the same data as the sensor database (e.g., sensor database 400 illustrated in FIG. 7). For example, the recommendations database 500 may include the system identification 502, the date 504 and the time 506 the data was obtained, the time range 508 over which data was obtained, a unique sequence ID 510, and data from the sequence of sensors 512, 514, 516, 518, 520. However, the recommendations database 500 may include only the sequences which have been determined to meet or exceed the predetermined threshold correlation factor.

Returning to FIG. 6, once the sequence has been stored, the machine learning module 244 may then determine if there are any sequences remaining that have not had a correlation analysis performed, as shown at block 328. If there are remaining sequences, the machine learning module 244 may then extract the next sequence, as shown at block 330. The machine learning module 244 may then run the correlation analysis for the next sequence and the correlation analysis process may be repeated. Returning to block 328, the correlation analysis process may be performed on all available sequences until there are no remaining sequences. Once there are no remaining sequences the machine learning module 244 and/or the base module 238 may be configured to transmit or send the recommendations database 242 to the action module 226 in the user device 224, as shown at block 332. Control may then be returned to the base module 238, as shown at block 334. Once control has returned to the base module 238, the process may continue with the base module sending another request for raw sequence data from the raw sequence database 216, as shown at block 304. It is contemplated that the correlation analysis may be performed on as many sequences as are contained within the sensor database 240. In some cases, the correlation analysis may be performed on more than one time range. For example, the machine learning module 244 may perform a correlation analysis on all events having a time range of 20 minutes. When there are no longer any sequences having a time range of 20 minutes the machine learning module may then look for sequences having a time range of more than 20 minutes or less than 20 minutes, etc.

Figure 9:
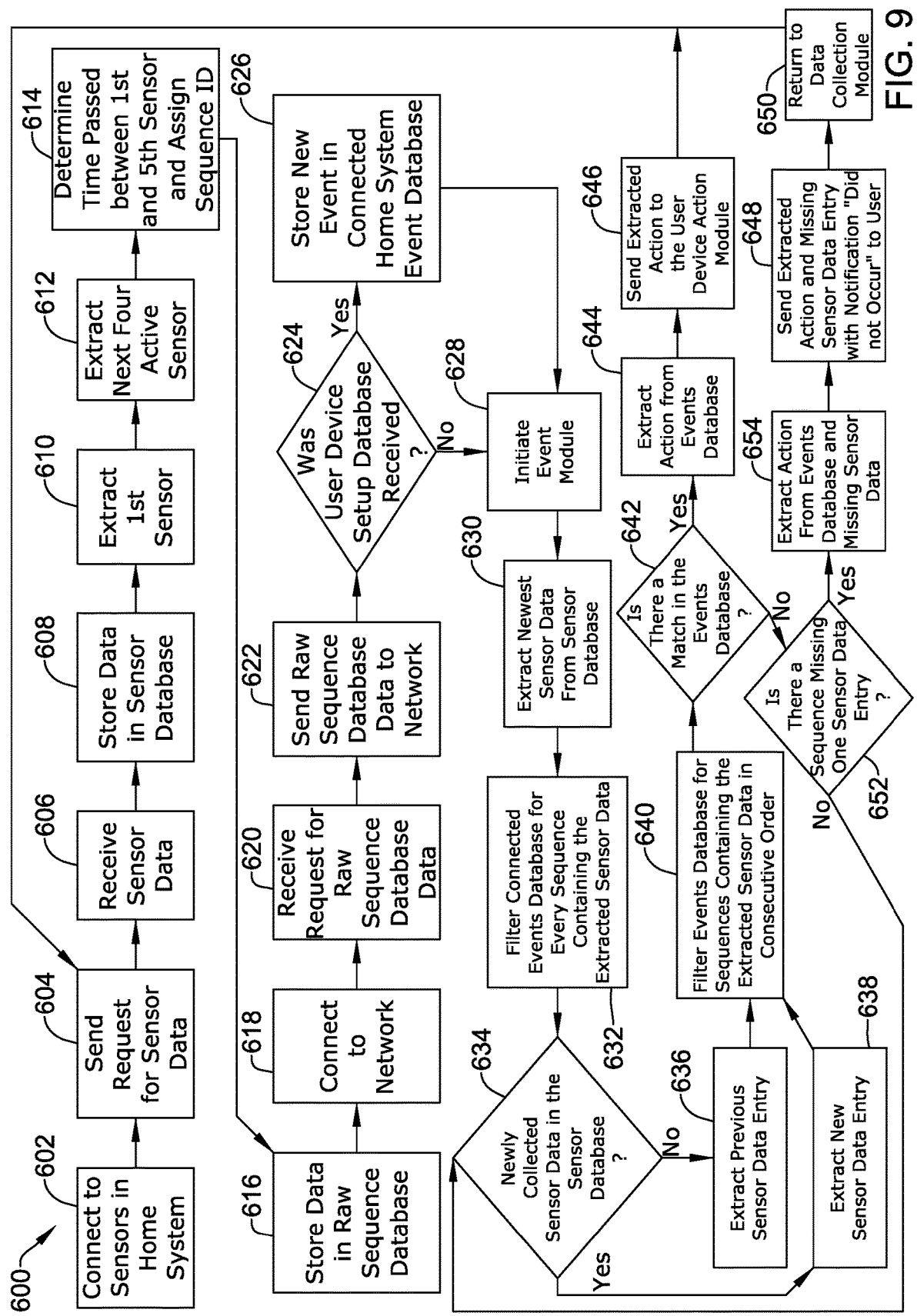
FIG. 9 is a flow chart of an illustrative method of data collection and event analysis at the building automation system.
Figure 10:
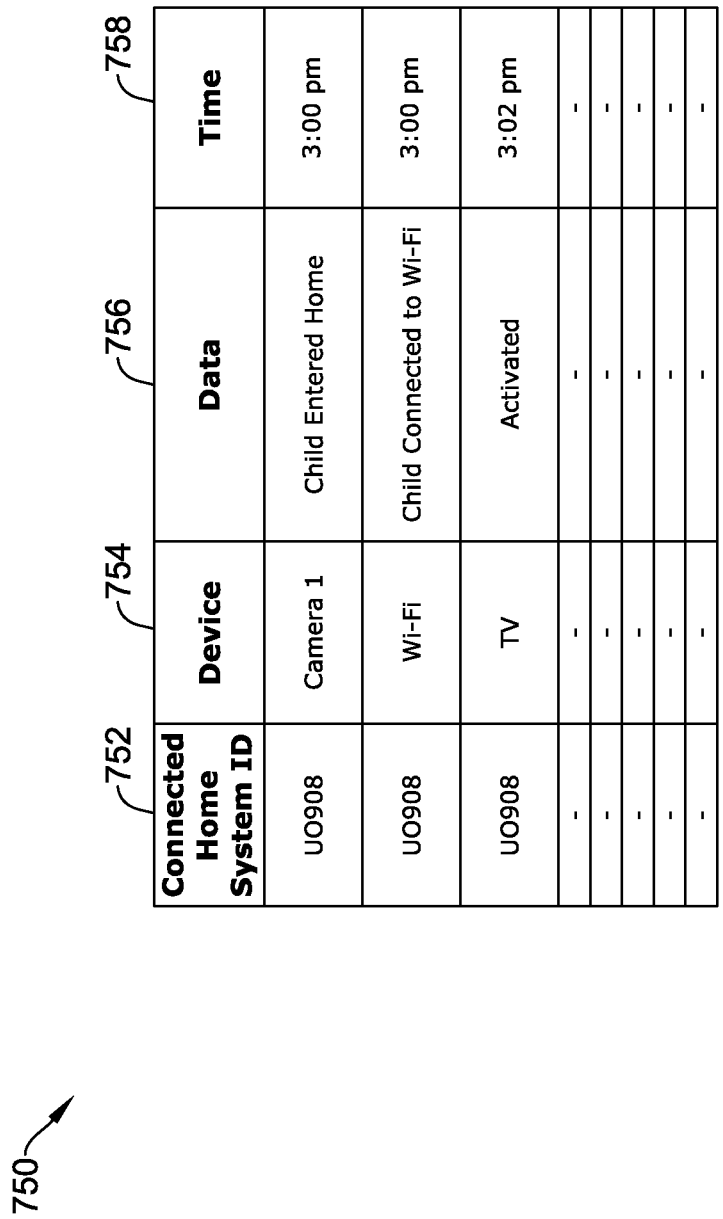
FIG. 10 is an illustrative sensor database.

FIG. 9 is a flow chart of an illustrative method 600 of data collection and event analysis at the building automation system 202. The process 600 begins with the data collection module 210 connecting to the sensors 206 in the building, as shown at block 602. The data collection module 210 may then send a request to each sensor for the sensor data from the sensors 206, as shown at block 604. The data collection module 210 may receive the sensor data, as shown at block 606, and store the data in the sensor database 212, as shown at block 608. Referring briefly to FIG. 10, which illustrates an example sensor database 750, the sensor database 750 may record additional information beyond the measured or perceived parameter. The sensor database 750 may record the system or building identification 752. The building identification 752 may tie the data to a particular controller 204 such that data can be aggregated with other systems, if so desired. The sensor database 750 may also record the device 754, the data 756, and the time 758 the data was recorded. In some cases, a length of time a reading is valid may also be recorded. While not explicitly shown, the sensor database 750 may also record the location of the sensor 206 and/or the date the data was recorded. The data may be binary (e.g., on/off, yes/no, etc.), an action, a numerical value, etc.

Returning to FIG. 9, a first sensor in the sensor database 212 is then extracted, as shown at block 610. In some cases, the first sensor may be the first sensor chronologically to activate or trigger. The next four (chronologically) active sensors are also extracted, as shown at block 612. It is contemplated that more than five sensors or fewer than five active sensors may be extracted to analysis. The data collection module 210 may then determine how much time has passed between the activation of the first sensor and activation of the last sensor which is defined as a time range and the data (e.g., the active sensors, start time, time range, etc.) is assigned a sequence identification (ID), as shown at block 614. As described above, the sequence ID may be an identification number that is unique to one specific sequence of sensors. In some cases, the sequence ID may include a system identification, although this is not required. The data collection module 210 may then store the data in the raw sequence database 216, as shown at block 616.

Referring briefly to FIG. 11, which illustrates an example building automation system raw sequence database 700, the raw sequence database 700 may contain all the sequence data collected from home automation system 202 and may record additional information beyond the measured or perceived perimeter. The raw sequence database 700 may record the system or building identification 702. The building identification 702 may link or tie the data in the corresponding row to a particular controller 204 or building system 202 such that data can be aggregated with and/or distinguished from other systems, as described above. The raw sequence database 700 may also record the date 704 and the time 706 the sensor data was obtained. In some cases, a time range 708 over which the data has been collected may also be recorded. Is contemplated that the time range 708 may correspond to a length of time between the first sensor activation (or data recording) and the last sensor activation (or data recording) in the sequence of data readings. The raw sequence database 700 may also record a sequence identification number 710. The sequence identification number 710 may include the system identification number 702 as well as a unique identifying number to link a sequence of sensor data readings to each other. The raw sequence database 700 may also record a sensor name and corresponding data 712, 714, 716, 718, 720. While the illustrative raw sequence database 700 shows five sensors for each sequence, it is contemplated that the sequence may have fewer than five or more than five sensor data readings, as desired. Further, each sequence does not necessarily include the same number of sensor data readings. For example, a first sequence may include four sensor data readings while another sequence may include six sensor data readings.

In some embodiments, the raw sequence database 700 may include several sequences 710 which include overlapping sensor data points. For example, referring to rows 722a, 722b, 722c (collectively, 722), the sequence in the first row 722a begins at a time of 6:00 AM with the first sensor 712 data point being an activated coffeepot. The sequence in the second row 722b begins at a time of 6:05 AM with the first sensor data point 712 being an activated alarm clock. As can be seen, the activated alarm clock is the second sensor data point 714 in the first sequence 722a. It is contemplated that providing multiple sensor data sequence start and end points may allow for more accurate event recommendations. For example, a user may choose not to automatically brew coffee each morning. In which case, the first sensor data sequence 722a may not allow the building automation system 202 to reliably recognize the action (e.g., a person waking up), as a sensor data reading may be missing from the defined event.

The sensor data readings (e.g., sensed conditions) illustrated in FIG. 11 are not intended to limit the order or type of information that can be used to define an event. Rather, the illustrated sensor data readings are provided to illustrate an example of some types of readings that can be used to suggest or recommend an event to a user. Some additional sensor data readings may include, but are not limited to, a mobile device entering or leaving a geofence perimeter, facial recognition, motion detection, opening and/or closing of doors and garage doors, code entry (door, security system, garage, etc.), Wi-Fi connection, activation/deactivation of IoT devices (e.g., coffee pots, alarm clocks, lights, televisions, etc.), A connection may then be established between the data collection module 210 (or controller 204) and the external server(s) 230, as shown at block 618. In some cases, the building automation system 202 may initiate the connection, although this is not required. The data collection module then receives a required from the base module 238 of the external server(s) 230 to send the data in the raw sequence database 216, shown at block 620. In response to this request, the data collection module 210 sends the raw sequence database 216 to the base module 238, as shown at block 622.

The data collection module 210 may then determine if the set-up database 234 was received from the user device 224, as shown at block 624. If the set-up database 234 was received, the new event (e.g., the sequence of sensors and time range assigned the sequence ID in block 614) is stored in the events database 214, as shown at block 626. If the setup database 234 was not received or after the new event is stored (block 626), the data collection module 210 may initiate the event module 222, as shown at block 628. The event module 222 begins by extracting the newest sensor data from the sensor database 212, as shown at block 630. The event module 222 then filters the events database 214 for every sequence containing the extracted sensor data, as shown at block 632. The event module 222 then determines if there is any newly collected sensor data in sensor database 212 (e.g., newer than the data extracted at block 630), as shown at block 634. If there is no new sensor data, the event module 222 may extract the previous sensor data entry (e.g., the sensor data entry prior to the data extracted at block 630), as shown at block 636. If there is new sensor data, the event module 222 extracts the new sensor data entry, as shown at block 638. From both block 636 and 638, the event module then filters the events database 214 for sequences containing the extracted sensor data in consecutive order, as shown at block 640. The event module 222 then determines if there is an exact match between the extracted sensor data sequence and a sequence of sensor data in the match in the events database 214, as shown at block 642.

Figure 12:
FIG. 12 is an illustrative building automation system events database.

If there is a match between the extracted sensor data sequence and a sequence of sensor data in the events database 214, the event module 222 extracts an action from the events database, as shown at block 644. Referring briefly to FIG. 12, which illustrates an example building automation system events database 800, the events database 800 may be include a list of sensor data sequences that can be used to compare against the collected sensor data to determine if there is a sequence in which the sensors 206 were activated that corresponds to an overall event. The events database 800 may record the system or building identification 802. The building identification 802 may link or tie the data in the corresponding row to a particular controller 204 or building system 202 such that data can be aggregated with and/or distinguished from other systems, as described above. The events database 800 may also record the date 804 and the time 806 the sensor data was obtained. In some cases, a time range 808 over which the data has been collected may also be recorded. It is contemplated that the time range 808 may correspond to a length of time between the first sensor activation (or data recording) and the last sensor activation (or data recording) in the sequence of data readings. The events database 800 may also record a sequence identification number 810. The sequence identification number 810 may include the system identification number 802 as well as a unique identifying number to link a sequence of sensor data readings to each other. The events database 800 may also record a sensor name and corresponding data 812, 814, 816, 818, 820. While the illustrative events database 800 shows space for five sensors in each sequence, it is contemplated that the sequence may have fewer than five or more than five sensor data readings, as desired. Further, each sequence does not necessarily include the same number of sensor data readings. For example, a first sequence may include four sensor data readings (as shown in row 830 of the events database 800) while another sequence may include six sensor data readings.

The events database 800 may include the action 822 which triggered the sequence of sensor data. For example, in row 826 the defined action is first owner arriving home. As the first owner arrives, the arrival triggers a sequence of sensor data points over a time period of 10 minute. For example, first the garage door is opened, then the front yard motion detector is activated, then the doorbell camera recognized the first owner, then the owner inputs the correct code into a "smart" lock and lastly a device of the first owner has connected to the building Wi-Fi. In row 828, the defined action is the second owner arriving home. In row 830, the defined action is a first child arriving home. In row 832, the defined action is a person waking up. Each defined action may also include an action or recommended response to be performed 824. In some cases, the action may be a notification is sent to a specific user as defined in the events database 800. The notification may be a single notification which replaces individual notifications for each sensor activation.

Returning to FIG. 9, the extracted action (e.g., a notification) is then sent to the user device 224, as shown at block 646. In some cases, the notification may include, but it not limited to information regarding the action, an alert level, and/or the number of inputs (e.g., sensor data readings) that were used to define the event. It is contemplated that there may be more than one user device 224 associated with the building automation system 202. In such an instance, the action in the events database 214 may define which of the user(s) the notification should be sent to. After the notification has been sent, the process may be repeated with the data collection module 210 sending a request for sensor data (block 604) such that the system 200 may continually look for and identify events.

Figure 13:
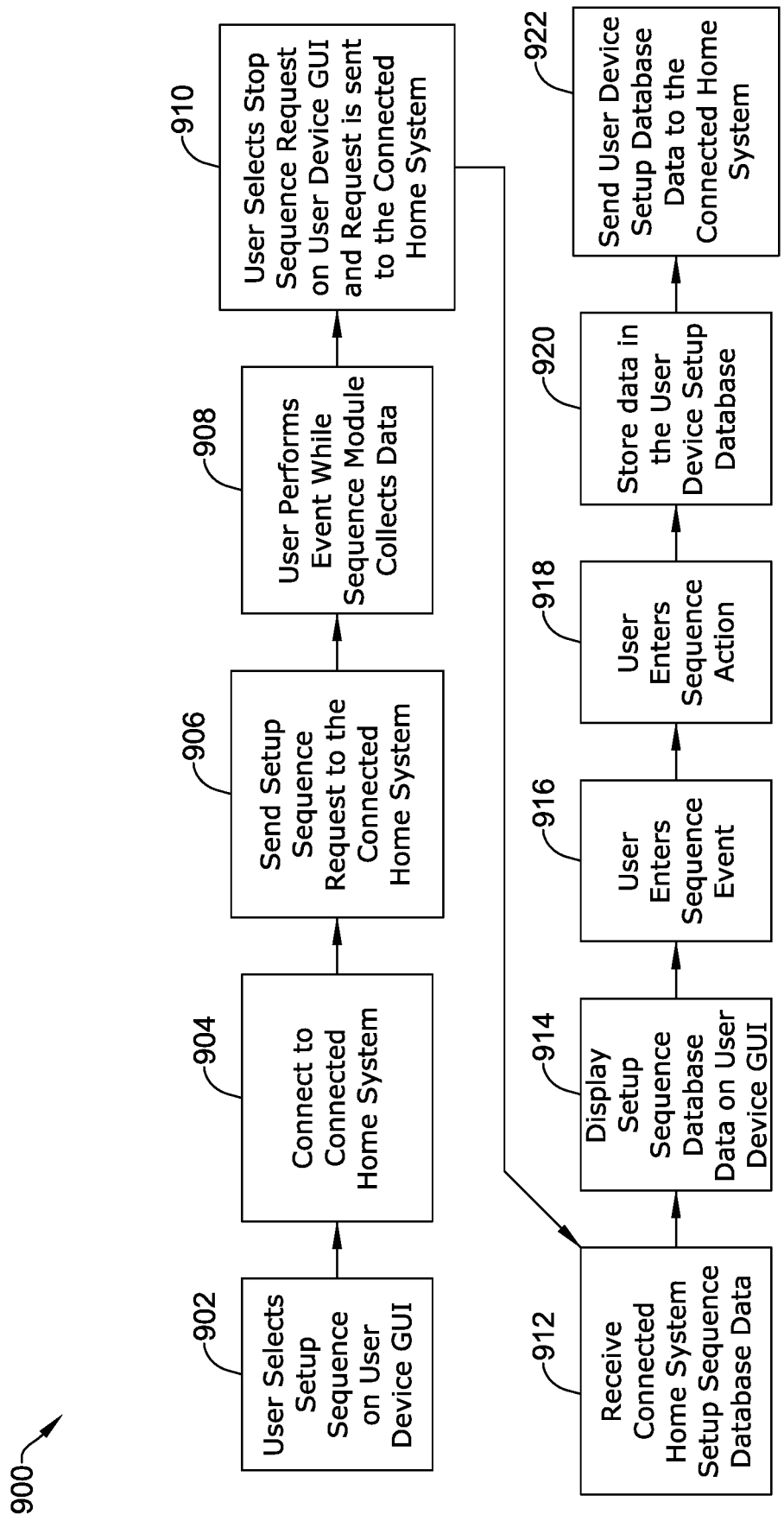
FIG. 13 is a flow chart of an illustrative method for establishing a user defined event.

Returning to block 642, if there is no match between the extracted sensor data sequence and a sequence of sensor data in the events database 214, the event module 222 determines if there is a sensor entry missing from a possible sequence match, as shown at block 652. For example, an extracted sensor sequence may be garage door opened, front yard motion detector activated, doorbell camera recognize a first owner, and the smart lock code is accepted. This sequence substantially matches the sensor sequence linked to the first owner arriving home in the events database 800, as shown in row 826 in FIG. 12. However, the sensor entry of the first owner connected to Wi-Fi is missing for the sensor data to match the event. In such an instance, the event module 222 extracts the action from the events database 214 along with the missing sensor data (e.g., in the above example, first owner connected to Wi-Fi), as shown at block 654. The event module 222 may send the extracted action (e.g., notification) to the user identified in the action as well as the missing sensor data and a notification that the missing sensor data did not occur, as shown at block 648. After the notification has been sent, the process may be repeated with control returning to the data collection module, as shown at block 650 and the data collection module 210 sending a request for sensor data (block 604) such that the system 200 may continually look for and identify events. Returning to block 652, if there is no sequence that is only missing one sensor entry, then the process would return to block 634 to determine if there is new sensor data. In some cases, if the sensor data partially matches a defined sequence (e.g., a sequence stored in the events database 214), the user may be sent a notification that an action was attempted (e.g., a security code was attempted) but it did not relate to a defined sequence. It is contemplated that the user may identify some actions which generate this type of notification. It is further contemplated that the user may be notified that an expected action did not occur. For example, the user may be notified if a child does not arrive home by an expected time FIG. 13 is an illustrative flow chart of a method 900 for establishing a user defined event. As described above, in some cases, events may be suggested to a user from an external server 230. However, in some cases, a user may wish to define one or more events. To begin, a user may enter a set-up sequence mode on the user device, as shown at block 902. This may be done by selecting a set-up sequence option on the user device interface 228 (e.g., via an app). It is contemplated that using a portable device 224 to facilitate programming of the event may allow a user to perform the action (e.g., arriving home) they wish to define as an event. The user device 224 may then connect to the sequence module 220 of the building automation system 200, as shown at block 904. The user device 224 may send a set-up sequence request which is received at the sequence module 220, as shown at block 906. Once the set-up sequence request has been received, the sequence module 220 may begin to collect sensor data while the user is performing the action (e.g. arriving home), as shown at block 908. For example, the user may choose to initiate the set-up sequence request as they are beginning an activity they wish to define as an event. Once the action has been performed, the user selects a command to stop the sequence on the user interface 228 of the user device 224 and the command is sent to the sequence module 220, as shown at block 910. If the stop command was not received, the sequence module 220 continues to collect data. Data is collected (including sensor data and a time range) until the stop sequence command is received at the sequence module 220 from the user device 224. Once the stop command is received, the sequence module 220 stores the data in the set-up sequence database 218 and sends said data to the user device 224, as shown at block 912. The data is displayed on the user interface 228 of the device 224, as shown at block 914. The user can then enter a sequence event name, such as, but not limited to "first owner arrived home", as shown at block 916. The user can also enter a sequence action, such as, but not limited to, "notify second owner", as shown at block 918. The event and sensor sequence data is stored in the set-up database 234 in the user device 224, as shown at block 920. The set-up database 234 may include similar information to the events database 800 described herein. The user device 224 may then send the set-up database 234 to the building automation system 200 where it is stored in the events database 214, as shown at block 922.

Figure 14:
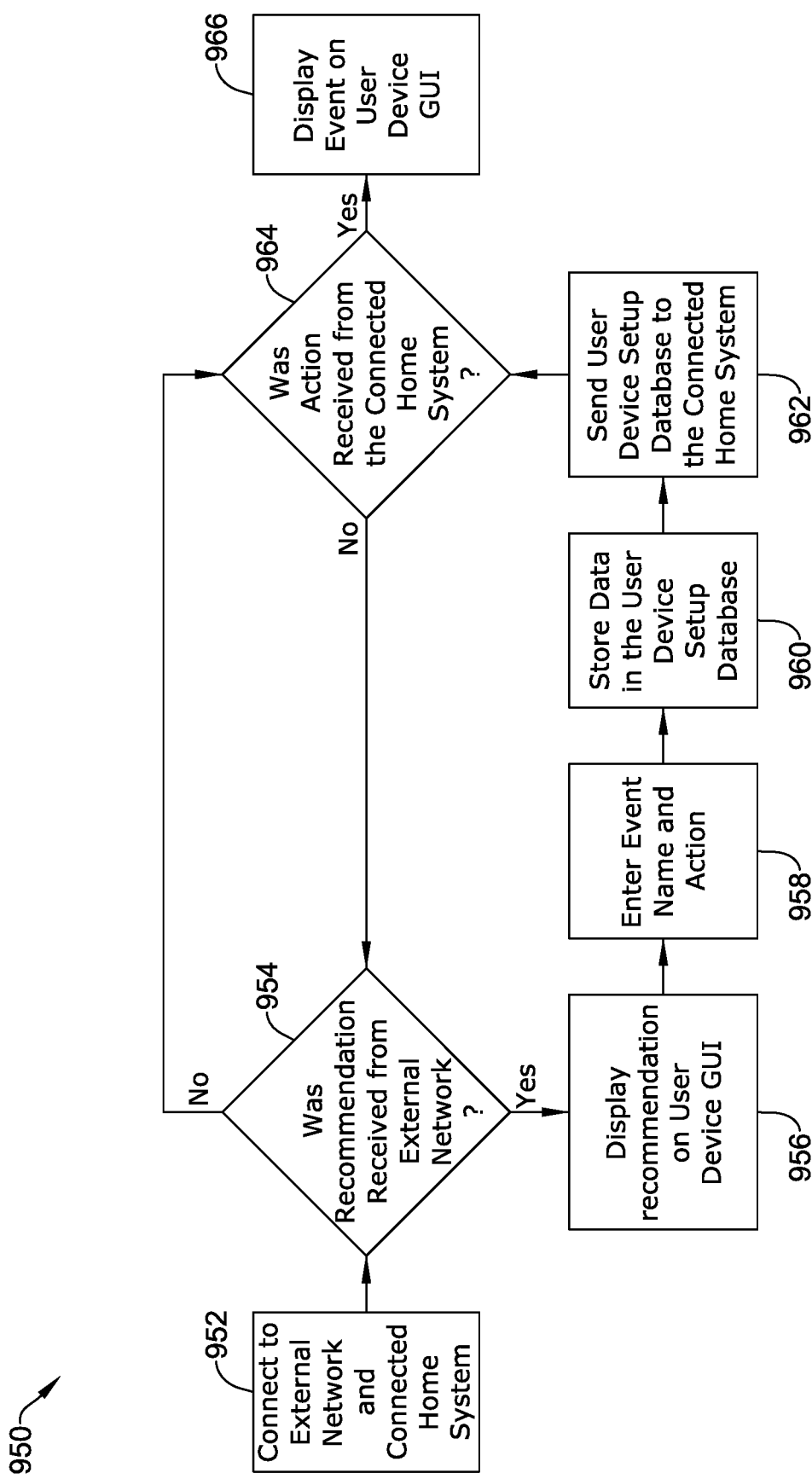
FIG. 14 is a flow chart of an illustrative method for establishing an event based off of a recommendation from the external server and receiving an action from the home automation system.

FIG. 14 is a flow chart of an illustrative method 950 for establishing an event based off of a recommendation from the external server 230 and receiving an action from the home automation system 202. The method may begin with the action module 226 of the user device 224 connect to the external server 230 and the home automation system 202, as shown at block 952. The action module 226 may determine if a recommendation was received from the external network 230 (see, for example, FIG. 6), as shown at block 954. If a recommendation was received, the recommendation is displayed on the user interface 228 of the user device 224, as shown at block 956. The user may then enter an event name (e.g., first child arriving home) and an action (e.g., notify first owner and second owner), as shown at block 958. The action module 226 then stores the data in the set-up database 234, as shown at block 960. The action module 226 may then send the new event to the events database 214 in the building automation system 202 where it is stored, as shown at block 962. The action module 226 may also determine if an action was received from the building automation system 202, as shown at block 964. If an action was received the notification or action is displayed on the user interface 228 of the user device. If no action was received the actions module 226 again determines if a recommendation was received, as shown at block 954. Returning to block 954, if no recommendation was received the action module 226 may also determine if an action was received from the building automation system 202, as shown at block 964. It is contemplated that the program code or app 232 may be configured to continuously cycle through the method 950. In other embodiments, the app 232 may be configured to perform the method 950 at predefined intervals (e.g., every 30 seconds, every minute, every five minutes, etc.), as desired.

The various modules described herein disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A method for detecting an event in or near a building, the method comprising:
storing two or more events, the two or more events being determined based at least in part on a sequence of sensor data points, the sequence of sensor data points being determined from monitoring a plurality of sensed conditions detected by a plurality of sensors in a building over a time period, the two or more events including:
    a first event determined based on a first sequence of sensor data points having a first start time within the time period, and
    a second event based on a second sequence of sensor data points having a second start time within the time period different from the first start time,
    wherein a portion of the first sequence of sensor data points overlaps a portion of the second sequence of sensor data points,
each event of the two or more events defining:
    a sequence of two or more conditions,
    an action associated with the sequence of two or more conditions, and
    a response to the sequence of two or more conditions;
monitoring one or more sensed conditions detected by one or more sensors in the building over time;
repeatedly comparing the one or more sensed conditions to the two or more events to identify when a sequence of sensed conditions matches the sequence of two or more conditions in at least one of the two or more events; and
performing the response defined by an event from the two or more events that defines the sequence of two or more conditions that matches the sequence of sensed conditions.

2. The method of claim 1, wherein the two or more events include a user defined event.

3. The method of claim 2, further comprising:
defining the user defined event, including:
    initiating a set-up sequence module,
    performing the action to be associated with a sequence of sensed conditions,
    recoding the sequence of sensed conditions as the action is recorded,
    exiting the set-up sequence module, and
    saving sequence of sensed conditions as the user defined event.

4. The method of claim 3, further comprising assigning an action name to the user defined event.

5. The method of claim 3, further comprising assigning a response to the user defined event.

6. The method of claim 1, wherein the event is an event by an external server.

7. The method of claim 1, wherein the action for at least one event is a person arriving at the building.

8. The method of claim 1, wherein the action for at least one event is a person leaving the building.

9. The method of claim 1, wherein the action for at least one event is a person waking up.

10. The method of claim 1, wherein the response comprises delivering a notification to a remote device over a network.

11. The method of claim 10, wherein the notification summarizes the action and the sequence of sensed conditions.

12. A building automation system configured to be used in or near a building, the system comprising:
a plurality of sensors, wherein each sensor of the plurality of sensors is configured to detect a condition of the building;
a memory for storing two or more events, the two or more events being determined based at least in part on a sequence of sensor data points, the sequence of sensor data points being determined from monitoring a first plurality of sensed conditions detected by the plurality of sensors in the building over a time period, the two or more events including:

a first event determined based on a first sequence of sensor data points having a first start time within the time period, and a second event based on a second sequence of sensor data points having a second start time within the time period different from the first start time, wherein a portion of the first sequence of sensor data points overlaps a portion of the second sequence of sensor data points, and wherein each event of the two or more events is associated with a sequence of sensed conditions and an action associated with the sequence of sensed conditions;

a communications module configured to communicate with a remote device over a network; and a controller operatively coupled to the plurality of sensors, the memory, and the communications module, the controller configured to:

compare a second plurality of sensed conditions to the two or more events to identify an action;

determine, based at least in part on comparing the second plurality of sensed conditions to the two or more events, whether a response is required]; and in response to determining that the response is required, provide a notification to the remote device via the communications module.

13. The system of claim 12, wherein a first sensor of the plurality of sensors comprises a motion detector.

14. The system of claim 12, wherein a first sensor of the plurality of sensors comprises a limit switch.

15. The system of claim 12, wherein a first sensor of the plurality of sensors comprises an Internet of Things (IoT) device.

16. The system of claim 12, wherein a first sensor of the plurality of sensors comprises a camera.

17. The system of claim 12, wherein a first sensor of the plurality of sensors comprises a network connection.

18. The system of claim 12, wherein the plurality of sensors are located at the building, the controller and the communications module are located in the building, and the remote device is a portable handheld device.

19. A server for monitoring a building, the server comprising:

a memory for storing two or more events, the two or more events being determined based at least in part on a sequence of sensor data points, the sequence of sensor data points being determined from monitoring a first plurality of sensed conditions detected by a plurality of sensors in the building over a time period, the two or more events including:

a first event determined based on a first sequence of sensor data points having a first start time within the time period, and a second event based on a second sequence of sensor data points having a second start time within the time period different from the first start time, wherein a portion of the first sequence of sensor data points overlaps a portion of the second sequence of sensor data points, and wherein each event of the two or more events is associated with a sequence of conditions, an action associated with the sequence of conditions, and a response;

an input/output port for receiving one or more sensed conditions from the building; and a controller operatively coupled memory and the input/output port, the controller configured to:

monitor the one or more sensed conditions over time;

repeatedly applying the two or more events to the one or more sensed conditions to identify when a sequence of sensed conditions matches the sequence of conditions associated with at least one of the two one or more events; and perform an action associated with the event that resulted in the match.

20. The server of claim 19, wherein the action triggers two or more sensors of the plurality of sensors.

* * * * *